(12) United States Patent
Takeo

(10) Patent No.: US 6,385,183 B1
(45) Date of Patent: May 7, 2002

(54) CDMA POWER CONTROL SYSTEM

(75) Inventor: Kohji Takeo, Yokohama (JP)

(73) Assignee: YRP Mobile Telecommunications Key Technology Research Laboratories Co., Ltd., Kanagawa-ken (JP)

(*) Notice: Subject to any disclaimer, the term of this patent is extended or adjusted under 35 U.S.C. 154(b) by 0 days.

(21) Appl. No.: 09/609,067

(22) Filed: Jun. 30, 2000

Related U.S. Application Data

(63) Continuation of application No. 09/014,593, filed on Jan. 28, 1998, now abandoned.

(30) Foreign Application Priority Data

| Jan. 29, 1997 | (JP) | 9-28288 |
| Nov. 18, 1997 | (JP) | 9-332364 |

(51) Int. Cl.[7] .............................................. H04J 13/00
(52) U.S. Cl. ...................... 370/335; 370/318; 370/320; 370/332; 370/342; 370/441; 375/130; 455/436; 455/522
(58) Field of Search ................................ 370/316, 318, 370/320, 331, 332, 335, 342, 337, 441; 455/69, 436, 443, 522; 375/130, 132, 138, 140

(56) References Cited

U.S. PATENT DOCUMENTS

| 5,245,629 A | 9/1993 | Hall ................................ 375/1 |
| 5,267,262 A | 11/1993 | Wheatley, III ............... 375/200 |
| 5,461,639 A | 10/1995 | Wheatley, III et al. ...... 370/342 |
| 5,485,486 A | 1/1996 | Gilhousen et al. ........... 370/335 |
| 5,574,972 A | 11/1996 | Hulbet ......................... 455/436 |
| 5,722,044 A | * 2/1998 | Padovani et al. ........... 455/33.1 |
| 5,722,051 A | 2/1998 | Agrawal et al. .............. 455/69 |
| 5,794,129 A | 8/1998 | Kamatsu ....................... 455/69 |
| 5,832,368 A | 11/1998 | Nakano et al. ................ 455/63 |
| 5,884,187 A | 3/1999 | Ziv et al. ..................... 455/522 |
| 5,930,242 A | 7/1999 | Mimura ...................... 370/331 |
| 6,166,622 A | * 12/2000 | Hosur et al. ................. 340/318 |
| 6,185,431 B1 | * 2/2001 | Li et al. ...................... 455/522 |

FOREIGN PATENT DOCUMENTS

| EP | EP 0565505 | 10/1993 | ........... H04B/7/005 |
| EP | EP 0741467 | 11/1996 | ............ H04B/7/26 |
| EP | 0762668 | 3/1997 | ........... H04B/7/005 |
| JP | 7-273722 | 10/1995 | ........... H04J/13/00 |
| JP | 9-139712 | 5/1997 | ............ H04B/7/26 |
| KR | 97-055716 | 7/1997 | ........... H04B/1/707 |
| KR | 97-055719 | 7/1997 | ........... H04B/1/707 |
| WO | WO 9802981 | 1/1998 | ........... H04B/7/005 |

* cited by examiner

*Primary Examiner*—Douglas Olms
*Assistant Examiner*—Shick Hom
(74) *Attorney, Agent, or Firm*—Israel Gopstein

(57) ABSTRACT

According to a power control system for a CDMA mobile radio communication network, powers at which downlink pilot signals are transmitted from base stations are controlled so that the numbers of mobile stations managed by the respective base stations will be in a predetermined range. In addition, powers at which uplink signals are transmitted from the mobile stations are controlled so that communication qualities related to the uplink signals received by the base stations will converge on a predetermined threshold value. On the basis of the above-mentioned principle, the designing of cells in the CDMA mobile radio communication network is implemented.

17 Claims, 18 Drawing Sheets

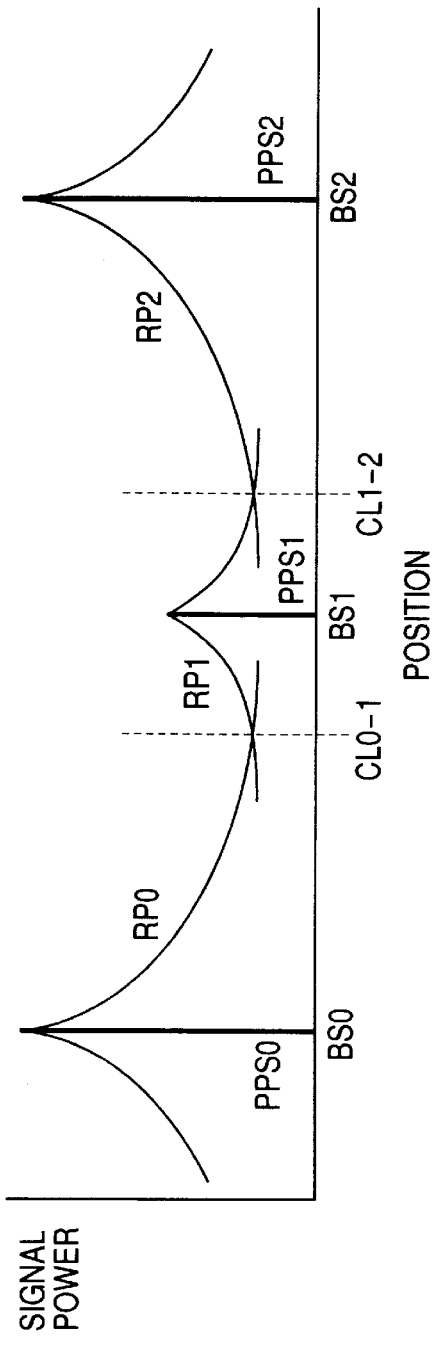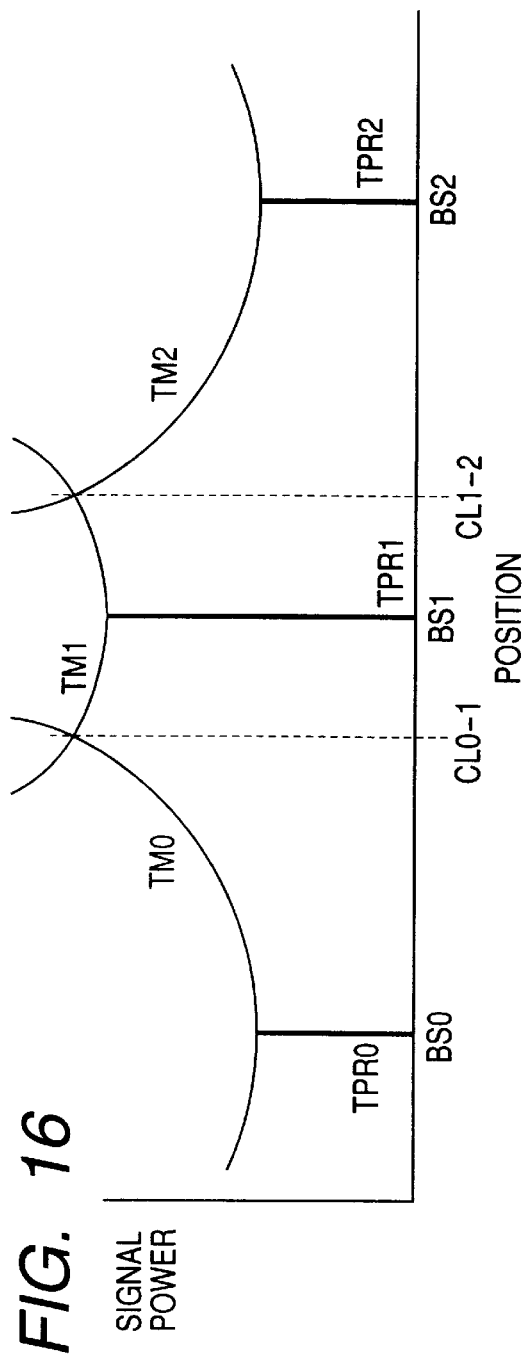

CDMA POWER CONTROL SYSTEM

This application is a con of Ser. No. 09/014,593 filed Jan. 28, 1998, abandoned.

BACKGROUND OF THE INVENTION

1. Field of the Invention

This invention relates to a power control system for a CDMA (code division multiple access) mobile radio communication network. Also, this invention relates to a method of determining the cell structure of a CDMA cellular mobile radio communication network. In addition, this invention relates to a CDMA cellular mobile radio communication network.

2. Description of the Related Art

In a CDMA (code division multiple access) mobile radio communication network, uplink radio signals transmitted from mobile stations toward a base station use a same frequency band. Accordingly, "near-far problems" tend to occur. Specifically, the radio signal received at the base station which is transmitted from a mobile station close to the base station significantly interferes with the radio signal transmitted from a mobile station far from the base station. Thus, the powers of the uplink radio signals outputted from the mobile stations are controlled to remove the near-far problems. In general, the power control is designed to equalize the intensities or the levels of uplink radio signals received at the base station. For example, the base station transmits control signals to the respective mobile stations, and the mobile stations adjust the powers of output radio signals in accordance with the control signals respectively. As will be explained later, a prior-art power control system has a drawback.

SUMMARY OF THE INVENTION

It is a first object of this invention to provide an improved CDMA power control system.

It is a second object of this invention to provide an improved method of determining the cell structure of a CDMA cellular mobile radio communication network.

It is a third object of this invention to provide an improved CDMA cellular mobile radio communication network.

A first aspect of this invention provides a power control system for a CDMA mobile radio communication network, comprising first means for controlling powers at which downlink pilot signals are transmitted from base stations so that the numbers of mobile stations managed by the respective base stations will be in a predetermined range; and second means for controlling powers at which uplink signals are transmitted from the mobile stations so that communication qualities related to the uplink signals received by the base stations will converge on a predetermined threshold value.

A second aspect of this invention is based on the first aspect thereof, and provides a power control system wherein the first means comprises means for updating the powers at which the downlink pilot signals are transmitted from the base stations when the numbers of the mobile stations managed by the base stations move out of an allowable range.

A third aspect of this invention is based on the first aspect thereof, and provides a power control system wherein the first means comprises means for updating the powers at which the downlink pilot signals are transmitted from the base stations when the communication qualities related to the uplink signals received by the base stations move out of an allowable range.

A fourth aspect of this invention is based on the first aspect thereof, and provides a power control system further comprising third means for setting desired powers of the uplink signals received by the base stations, and wherein the first means comprises means for updating the powers at which the downlink pilot signals are transmitted from the base stations when the desired powers of the uplink signals received by the base stations move out of an allowable range.

A fifth aspect of this invention is based on the first aspect thereof, and provides a power control system wherein the first means comprises means for updating the powers at which the downlink pilot signals are transmitted from the base stations, and the second means comprises means for controlling the powers at which the uplink signals are transmitted from the mobile stations in response to the powers of the downlink pilot signals which are updated by the means in the first means.

A sixth aspect of this invention provides a method of determining the cell structure of a CDMA cellular mobile radio communication network, comprising the steps of (1) updating powers at which downlink pilot signals are transmitted from base stations in response to differences between uplink communication qualities regarding the respective base stations and an average value among the uplink communication qualities regarding the respective base stations; (2) updating desired powers of uplink signals received by the respective base stations in response to the differences between the uplink communication qualities regarding the respective base stations and the average value among the uplink communication qualities regarding the respective base stations; (3) iterating the steps (1) and (2) until the uplink communication qualities regarding the respective base stations are substantially equal to each other; and (4) determining pilot-signal transmission powers and desired uplink received-signal powers regarding the respective base stations by executing the steps (1), (2), and (3).

A seventh aspect of this invention is based on the sixth aspect thereof, and provides a method further comprising the steps of calculating differences between a threshold value for powers of pilot signals received by mobile stations and lowest values of powers of pilot signals received by the mobile stations, and updating the pilot-signal transmission powers in the base stations in response to the differences between the threshold value for the powers of the pilot signals received by the mobile stations and the lowest values of the powers of the pilot signals received by the mobile stations.

An eighth aspect of this invention is based on the sixth aspect thereof, and provides a method further comprising the steps of calculating numbers of base stations connecting with the respective base stations, calculating differences between an average number of connecting mobile stations per base station and the numbers of the base stations connecting with the respective base stations, and updating the pilot-signal transmission powers in the base stations in response to the calculated differences between the average number of connecting mobile stations per base station and the numbers of the base stations connecting with the respective base stations.

A ninth aspect of this invention is based on the sixth aspect thereof, and provides a method further comprising the step of updating positions of the respective base stations in response to the differences between the uplink communication qualities regarding the respective base stations and the average value among the uplink communication qualities regarding the respective base stations.

A tenth aspect of this invention is based on the sixth aspect thereof, and provides a method further comprising the steps of making a simulation model on the basis of a predicted distribution of mobile stations and measured values of signal propagation characteristics, and executing the steps (1), (2), (3), and (4) with respect to the simulation model.

An eleventh aspect of this invention is based on the sixth aspect thereof, and provides a method further comprising the steps of measuring the communication qualities related to the uplink signals received by the base stations, and executing the steps (1), (2), (3), and (4) in the base stations.

A twelfth aspect of this invention provides a CDMA cellular mobile radio communication network comprising base stations; mobile stations; first means provided in the base stations for measuring uplink communication qualities regarding the respective base stations; second means for updating powers at which downlink pilot signals are transmitted from the base stations in response to differences between the uplink communication qualities regarding the respective base stations and an average value among the uplink communication qualities regarding the respective base stations; third means for updating desired powers of uplink signals received by the respective base stations in response to the differences between the uplink communication qualities regarding the respective base stations and the average value among the uplink communication qualities regarding the respective base stations; and fourth means for causing the second means and the third means to iterate the updating until the uplink communication qualities regarding the respective base stations converge on the average value among the uplink communication qualities regarding the respective base stations, and thereby for determining pilot-signal transmission powers and desired uplink received-signal powers regarding the respective base stations.

A thirteenth aspect of this invention is based on the twelfth aspect thereof, and provides a CDMA cellular mobile radio communication network further comprising a control center connected to the base stations and calculating the average value among the uplink communication qualities regarding the respective base stations.

A fourteenth aspect of this invention is based on the twelfth aspect thereof, and provides a CDMA cellular mobile radio communication network further comprising fifth means for causing the second means and the third means to execute the updating when the number of the base stations is changed.

A fifteenth aspect of this invention is based on the twelfth aspect thereof, and provides a CDMA cellular mobile radio communication network further comprising fifth means for calculating differences between a threshold value for powers of pilot signals received by mobile stations and lowest values of powers of pilot signals received by the mobile stations, and sixth means for updating the pilot-signal transmission powers in the base stations in response to the differences between the threshold value for the powers of the pilot signals received by the mobile stations and the lowest values of the powers of the pilot signals received by the mobile stations.

A sixteenth aspect of this invention is based on the twelfth aspect thereof, and provides a CDMA cellular mobile radio communication network further comprising fifth means for calculating numbers of the base stations connecting with the respective base stations, sixth means for calculating differences between an average number of connecting mobile stations per base station and the numbers of the base stations connecting with the respective base stations, and seventh means for updating the pilot-signal transmission powers in the base stations in response to the calculated differences between the average number of connecting mobile stations per base station and the numbers of the base stations connecting with the respective base stations.

A seventeenth aspect of this invention provides a CDMA mobile radio communication network comprising at least one base station; mobile stations connectable with the base station; first means provided in the base station for transmitting a downlink signal at a variable power; second means for detecting the number of the mobile stations currently connecting with the base station; and third means for decreasing the power, at which the first means transmits the downlink signal, as the mobile-station number detected by the second means increases.

BRIEF DESCRIPTION OF THE DRAWINGS

FIG. 15 is a diagram of the relation among pilot-signal powers in base stations, powers of pilot signals received by mobile stations, and the distances between the base stations and the mobile stations.

FIG. 16 is a diagram of the relation among desired received-signal powers in base stations, mobile-station transmission powers to attain the desired received-signal powers, and the distances between mobile stations and the base stations.

DESCRIPTION OF THE PREFERRED EMBODIMENTS

Figure 1:
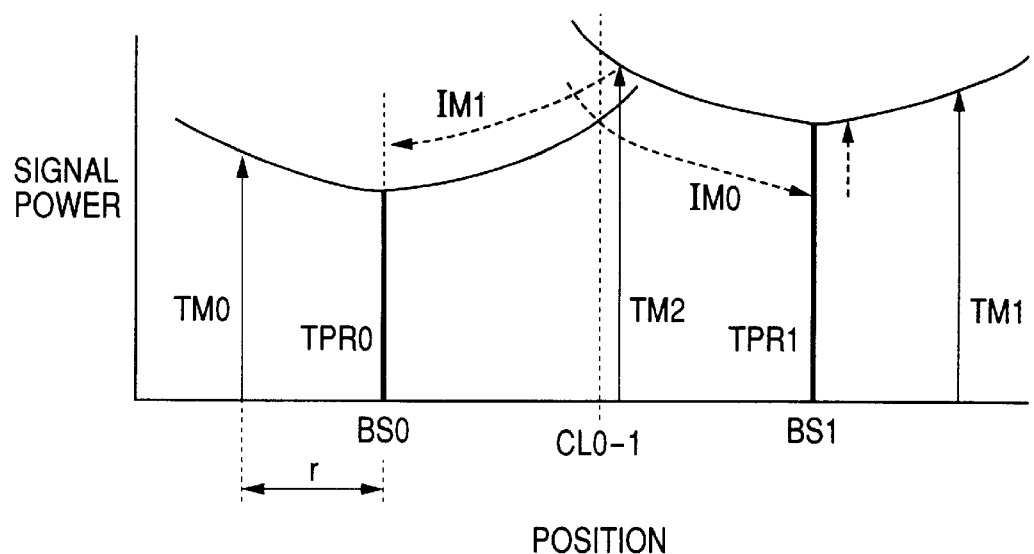
FIG. 1 is a diagram of the relation among desired received-signal powers in base stations, mobile-station transmission powers to attain the desired received-signal powers, and the distances between mobile stations and the base stations which is provided by a prior-art power control system.

Prior-art systems will be explained hereinafter for a better understanding of this invention.

T. Dohi, M. Sawahashi, and F. Adachi have reported "Performance of SIR Based Power Control in the Presence of Non-uniform Traffic Distribution", IEEE ICUPC, 1995. They have investigated a reverse-link transmit power control scheme based on received signal-to-interference power ratio (SIR) measurements in a DS-CDMA (direct sequence code division multiple access) cellular system with a non-uniform traffic distribution. During the investigation, the statistics of the received SIR at the cell site and the reverse-link transmitter power are evaluated by computer simulations, and a consideration is given of a maximal ratio combining (MRC) diversity hand-over (DHO) scheme. As the transmitter power of the portable station is adaptively controlled, the quality of each user's reverse-link channel can be maintained with a reduced transmission power. It is confirmed that SIR-based power control can significantly reduce the transmission power of portable stations even under non-uniform traffic distributions, and a further reduction is achieved by using MRC-DHO.

A prior-art micro-cell system enables an increase in the number of mobile stations which can be accommodated in a mobile radio communication network. According to the prior-art micro-cell system, the whole area covered by the mobile radio communication network is divided into micro-cells having relatively small areas. In general, as the area of one cell decreases, the efficiency of frequency use increases. The increased efficiency of frequency use provides an increased number of mobile stations which can be accommodated in a mobile radio communication network. On the other hand, as the area of each cell decreases, the traffic of the cell is more affected by the environments and the population thereof. Thus, as the area of each cell decreases, the traffic tends to significantly vary from cell to cell. In other words, as the area of each cell decreases, the traffics of the respective cells tend to be significantly non-uniform. Such a non-uniform traffic distribution causes a drop in the efficiency of the mobile radio communication network. Here, the traffic of each cell means the number of mobile stations which can be accommodated in each cell, or the amount or the rate of data which can be transmitted in each cell.

In a prior-art CDMA (code division multiple access) mobile radio communication network, uplink radio signals transmitted from mobile stations toward a base station use a same frequency band. Accordingly, "near-far problems" tend to occur. Specifically, the radio signal received at the base station which is transmitted from a mobile station close to the base station significantly interferes with the radio signal transmitted from a mobile station far from the base station. Thus, the powers of the uplink radio signals outputted from the mobile stations are controlled to remove the near-far problems. In general, the power control is designed to equalize the intensities or the levels of uplink radio signals received at the base station.

In a prior-art CDMA cellular mobile radio communication network, a non-uniform traffic distribution causes a drop in the efficiency of the network. In the prior-art CDMA cellular mobile radio communication network, the SIR (the signal-to-interference ratio) for an uplink radio signal from a mobile station in a cell is given as follows.

$$SIR=S/(A \cdot S+B) \quad (1)$$

where "S" denotes a power of the uplink radio signal corresponding to, for example, a desired power of a received uplink radio signal at a base station which is set in transmission power control. In addition, "A" denotes the number of other mobile stations in the cell of interest, and "B" denotes the total amount of interferences with the cell of interest which are caused by adjacent cells.

As the number of other mobile stations increases (the traffic increases) or the total amount of interferences caused by adjacent cells increases, the SIR drops. On the other hand, as the traffic decreases, the SIR rises. Such a decrease in the traffic at a certain cell causes a drop in the efficiency of the network.

There is a prior-art power control system for a CDMA mobile radio communication network. According to the prior-art power control system, a desired uplink received-signal power is controlled in response to an SIR to compensate for a non-uniform traffic distribution.

FIG. 1 relates to the prior-art power control system. With reference to FIG. 1, desired powers of received radio signals at base stations BS0 and BS1 are denoted by TPR0 and TPR1 respectively. A mobile-station transmission power to attain the desired received-signal power TPR0 is denoted by TM0 while mobile-station transmission powers to attain the desired received-signal power TPR1 are denoted by TM1 and TM2.

Generally, a mobile-station transmission power TM and a desired received-signal power TPR have the following relation.

$$TPR = TM \cdot r^{-k} \qquad (2)$$

where "r" denotes the distance between a mobile station and a base station, and "k" denotes a propagation attenuation factor in the range of, for example, 3 to 4.

According to the prior-art power control system, when the SIR for a received signal at the base station BS1 drops, the base station BS1 increases the desired received-signal power TPR1, that is, the signal power S in the equation (1). The increase in the signal power S suppresses the drop in the SIR which results from, for example, an increase in the total amount B of interferences caused by adjacent cells.

With reference to FIG. 1, IM0 denotes the amount of interference with the base station BS1 which is caused by a mobile station located at an inter-cell boundary CL0-1 and being connected to the base station BS0. The amount IM0 of interference with the base station BS1 corresponds to less than the desired received-signal power TRP1 related to the base station BS1.

Regarding the equation (1), if the signal power S is infinitely great, the SIR is approximately equal to 1/A and the interference factor B is negligible.

Figure 2:
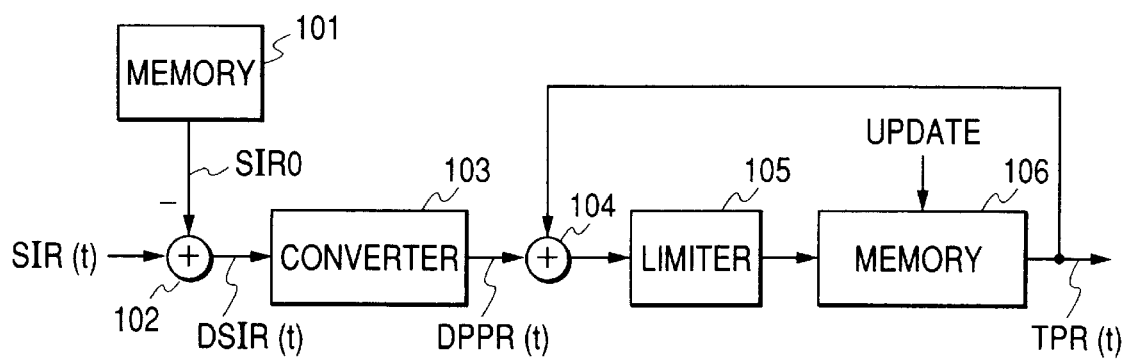
FIG. 2 is a block diagram of a portion of the prior-art power control system which relates to a base station.

FIG. 2 shows a portion of the prior-art power control system which relates to a base station. With reference to FIG. 2, the base station iteratively measures the SIR for a received radio signal at a predetermined period, and the current measured value of the SIR is denoted by SIR(t). The base station includes a memory 101 which stores information of a predetermined reference value SIR0 for the SIR. The base station implements the prior-art power control so that the current measured value SIR(t) will converge on the reference value SIR0.

Also, the base station includes a subtracter 102 connected to the memory 101 and receiving information of the current measured value SIR(t). The subtracter 102 calculates the difference DSIR(t) between the current measured value SIR(t) and the reference value SIR0 according to the following equation.

$$DSIR(t) = SIR(t) - SIR0 \qquad (3)$$

The base station includes a converter 103 following the subtracter 102. The converter 103 changes the calculated difference DSIR(t) into an updating value or a variation value DTPR(t) for a desired received-signal power TPR(t). The relation between the calculated difference DSIR(t) and the updating value DTPR(t) is given as follows.

$$DTPR(t) = f\{DSIR(t)\} \qquad (4)$$

where "f{ . . . }" denotes a predetermined conversion function being, for example, a proportional function or a step function.

Furthermore, the base station includes an adder 104 and a memory 106. The memory 106 stores information of the current desired received-signal power TPR(t). The adder 104 is connected to the converter 103 and the memory 106, and adds the current desired received-signal power TPR(t) and the updating value DTPR(t) into a basic new desired received-signal power TPR(t+1)BAS. The adder 104 is followed by a limiter 105. The limiter 105 sets the dynamic range of the desired received-signal power TPR. Specifically, the limiter 105 sets the upper limit and the lower limit of the desired received-signal power TPR. The device 105 limits the basic new desired received-signal power TPR(t+1)BAS to within the range between predetermined upper and lower limits, thereby modifying the basic new desired received-signal power TPR(t+1)BAS into a final new desired received-signal power TPR(t+1). The limiter 105 is followed by the memory 106. In the memory 106, information of the new desired received-signal power TPR(t+1) replaces the information of the current desired received-signal power TPR(t). In other words, the current desired received-signal power TPR(t) is updated into the new desired received-signal power TPR(t+1). The updating of the desired received-signal power TPR is iteratively implemented at a predetermined period in the range of, for example, several hundreds of milliseconds to several seconds.

The base station periodically transmits information of the difference between the actual received-signal power and the desired received-signal power TPR to each of connected mobile stations as a control signal in a downlink signal. Each of the mobile stations controls its transmission power in response to the received control signal. The prior-art transmission power control is designed to provide the following processes. When the current measured value SIR(t) decreases below the reference value SIR0 in the base station, the mobile station increases its transmission power to move later measured values SIR(t+1), SIR(t+2), . . . toward the reference value SIR0. When the current measured value SIR(t) increases above the reference value SIR0 in the base station, the mobile station decreases its transmission power to move later measured values SIR(t+1), SIR(t+2), . . . toward the reference value SIR0.

Regarding the equation (1), if the signal power S is infinitely great, the SIR is approximately equal to 1/A and the interference factor B is negligible. In the prior-art power control system, if the number "A" of mobile stations in a cell excessively increases, the SIR decreases below an acceptable level. In the prior-art power control system, an increase in the signal power S causes an increased transmission power in the related mobile station, and hence causes increased interferences with adjacent cells.

With reference to FIG. 1 relating to the prior-art power control system, IM1 denotes the amount of interference with the base station BS0 which is caused by a mobile station located at the inter-cell boundary CL0-1 and being connected to the base station BS1. The amount IM1 of interference with the base station BS0 corresponds to greater than the desired received-signal power TPR0 related to the base station BS0.

Figure 3:
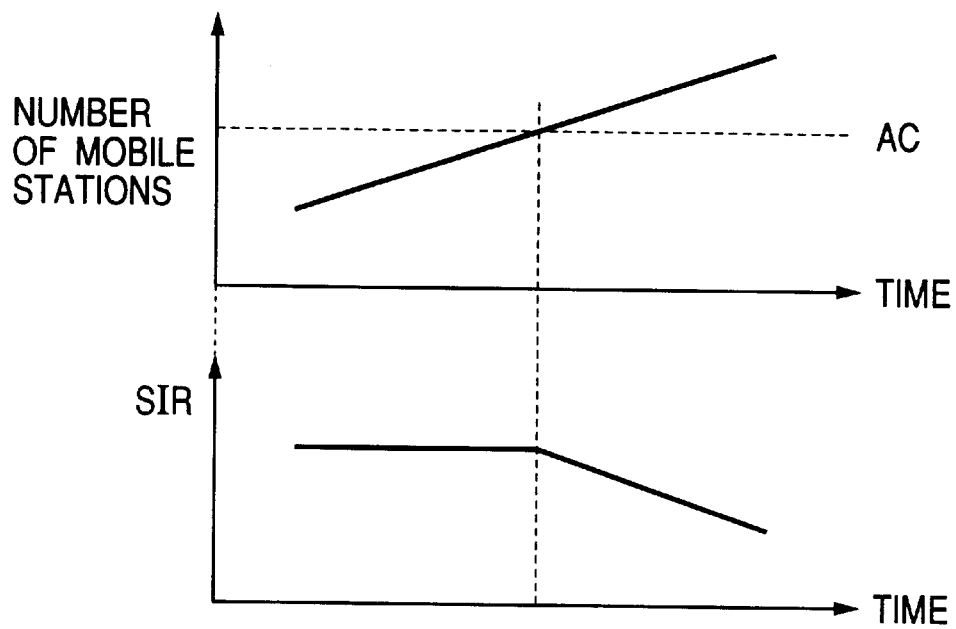
FIG. 3 is a time-domain diagram of the number of mobile stations and a communication quality (a signal-to-interference ratio) SIR which are provided by the prior-art power control system.

FIG. 3 shows the relation between the SIR and the number of mobile stations in a cell which is available in the prior-art power control system. It Is assumed that as shown in FIG. 3, the number of mobile stations in the cell increases in accordance with the lapse of time. With reference to FIG. 3, according to the prior-art power control system, the SIR is fixed at a given acceptable level as the number of mobile stations in the cell increases to a certain number Ac. The SIR drops as the number of mobile stations in the cell increases above the certain number Ac. Accordingly, in this case, the SIR drops into an acceptable range.

This invention is designed to remove such a drawback of the prior-art power control system.

First Embodiment

An SIR (signal-to-interference ratio) indicates the quality of communication. Accordingly, the SIR is also referred to as the communication quality SIR.

Figure 4:
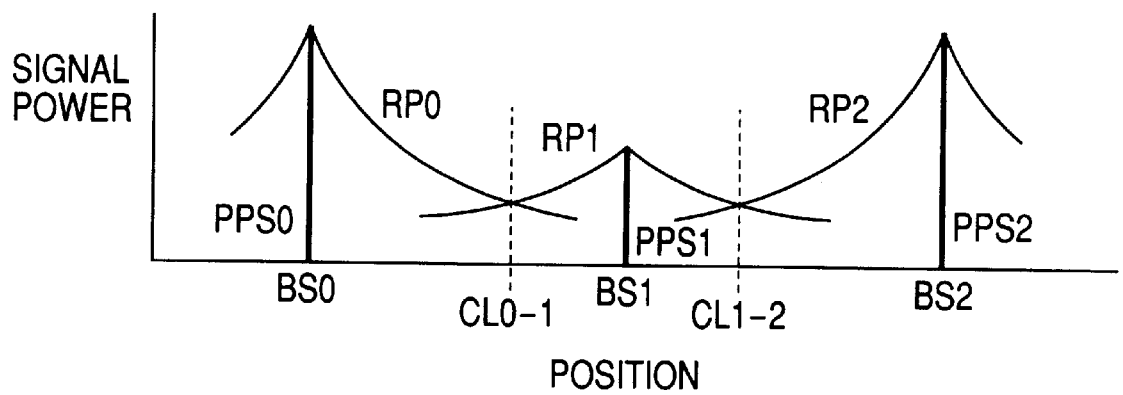
FIG. 4 is a diagram of the relation among pilot-signal powers in base stations, powers of pilot signals received by mobile stations, and the distances between the base stations and the mobile stations according to a first embodiment of this invention.

With reference to FIG. 4, there are base stations BS0, BS1, and BS2 in respective cells. The base stations BS0, BS1, and BS2 transmit downlink pilot radio signals respectively. As shown in FIG. 4, regarding the base station BS0, the power RP0 of the downlink pilot radio signal received at a mobile station drops as the mobile station is more distant from the base station BS0. Regarding the base station BS1, the power RP1 of the downlink pilot radio signal received at a mobile station drops as the mobile station is more distant from the base station BS1. Regarding the base station BS2, the power RP2 of the downlink pilot radio signal received at a mobile station drops as the mobile station is more distant from the base station BS2.

In general, a mobile station receives downlink pilot radio signals from plural base stations, and detects the powers (the strengths) of the received downlink pilot radio signals. The mobile station compares the detected powers of the received downlink pilot radio signals with each other, and selects one from among the plural base stations which relates to the greatest of the detected powers of the received downlink pilot radio signals. The mobile station is designed so that it will connect with the selected base station with first priority.

Accordingly, with reference to FIG. 4, the boundary CL0-1 between the cells related to the base stations BS0 and BS1 is a place at which the distance-dependent power RP0 of the downlink pilot radio signal from the base station BS0 and the distance-dependent power RP1 of the downlink pilot radio signal from the base station BS1 are equal to each other. Similarly, the boundary CL1-2 between the cells related to the base stations BS1 and BS2 is a place at which the distance-dependent power RP1 of the downlink pilot radio signal from the base station BS1 and the distance-dependent power RP2 of the downlink pilot radio signal from the base station BS2 are equal to each other.

It is assumed that plural mobile stations are within the cell related to the base station BS1 and are connected therewith. The base station BS1 monitors the qualities (the SIR's) of communications with the respective mobile stations. The base station BS1 calculates a representative communication quality SIR from the monitored communication qualities through, for example, an averaging process. When the representative communication quality SIR drops below a predetermined reference level, the base station BS1 lowers the transmission power PPS1 of its downlink pilot radio signal. As a result, the cell related to the base station BS1 contracts while the cells related to the base stations BS0 and BS2 expand, and one or more mobile stations are placed from the cell related to the base station BS1 to the cells related to the base stations BS0 and BS2. In other words, hand-off is implemented with respect to one or more mobile stations. Thus, with reference to the equation (1), there occurs a decrease in the number "A" of mobile stations in the cell related to the base station BS1, and the communication quality SIR increases. In this way, the previously-indicated drop in the representative quality (the SIR) of communications between the base station BS1 and the mobile stations is compensated.

Figure 5:
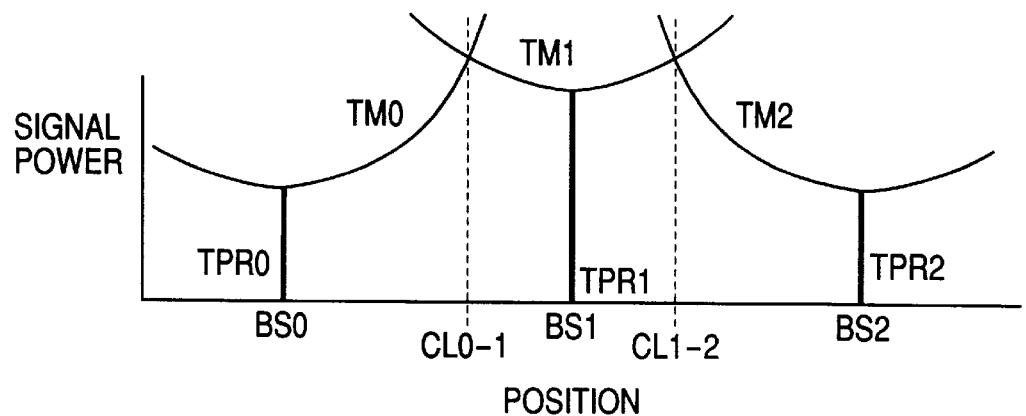
FIG. 5 is a diagram of the relation among desired received-signal powers in base stations, mobile-station transmission powers to attain the desired received-signal powers, and the distances between mobile stations and the base stations which is provided in the first embodiment of this invention.

With reference to FIG. 5, desired powers of received radio signals at base stations BS0, BS1, and BS2 are denoted by TPR0, TPR1, and TPR2 respectively. A mobile-station transmission power to attain the desired received-signal power TPR0 is denoted by TM0. Mobile-station transmission powers to attain the desired received-signal powers TPR1 and TPR2 are denoted by TM1 and TM2 respectively.

According to the function provided by a power control system and defined by the equation (2), the uplink signal transmission power TM0 in a mobile station connecting with the base station BS0 increases as the mobile station is more distant from the base station BS0. Similarly, the uplink signal transmission power TM1 in a mobile station connecting with the base station BS1 increases as the mobile station is more distant from the base station BS1. In addition, the uplink signal transmission power TM2 in a mobile station connecting with the base station BS2 increases as the mobile station is more distant from the base station BS2.

In the case where the base station BS1 lowers the transmission power PPSL of its downlink pilot radio signal so that the cell related to the base station BS1 contracts and the inter-cell boundaries CL0-1 and CL1-2 move toward the base station BS1, the uplink signal transmission powers TM0 and TM2 in mobile stations connected to the base stations BS0 and BS2 and located near the inter-cell boundaries CL0-1 and CL1-2 are relatively great. The great uplink signal transmission powers TM0 and TM2 might intensify interferences with the base station BS1. To prevent the occurrence of such a problem, the base station BS1 increases the desired received-signal power TPR1. As the desired received-signal power TPR1 is increased, communications between the base station BS1 and mobile stations are less adversely affected by the mobile stations connected to the base stations BS0 and BS2.

The base station in each cell controls the power of its downlink pilot radio signal and the desired received-signal power in response to the number of mobile stations in the cell and the representative communication quality SIR at the base station. As previously explained, the control of the power of the downlink pilot radio signal results in a change in the area of the cell. The change in the area of the cell and the control of the desired received-signal power are designed to hold the representative communication quality SIR in an acceptable range. Accordingly, even in a non-uniform traffic distribution, an adequate representative communication quality SIR can be maintained and mobile stations can be efficiently connected with base stations.

As previously explained, when the power of a downlink pilot radio signal is varied so that the related cell contracts or expands, there is a chance that a mobile station undergoes hand-off even when being stationary. Here, "hand-off" means a change of a base station with which the mobile station connects. Accordingly, to maintain acceptable stabilities of communications, it is preferable to provide a low frequency of the execution of change in the power of the downlink pilot radio signal. The control of the desired received-signal powers is able to compensate for a non-uniform traffic distribution by a certain degree. The control of the power of the downlink pilot radio signal and the control of the desired received-signal power are iteratively executed at, for example, different periods respectively. It is preferable that the period of the control of the power of the downlink pilot radio signal is longer than the period of the control of the desired received-signal power. A non-uniform traffic distribution having a given degree of non-uniformness or less is tackled by the control of the desired received-signal power. A non-uniform traffic distribution having greater than the given degree of non-uniformness is tackled by the control of the power of the downlink pilot radio signal. Thereby, the frequency of the occurrence of hand-off can be reduced while a non-uniform traffic distribution can be adequately compensated.

Figure 6:
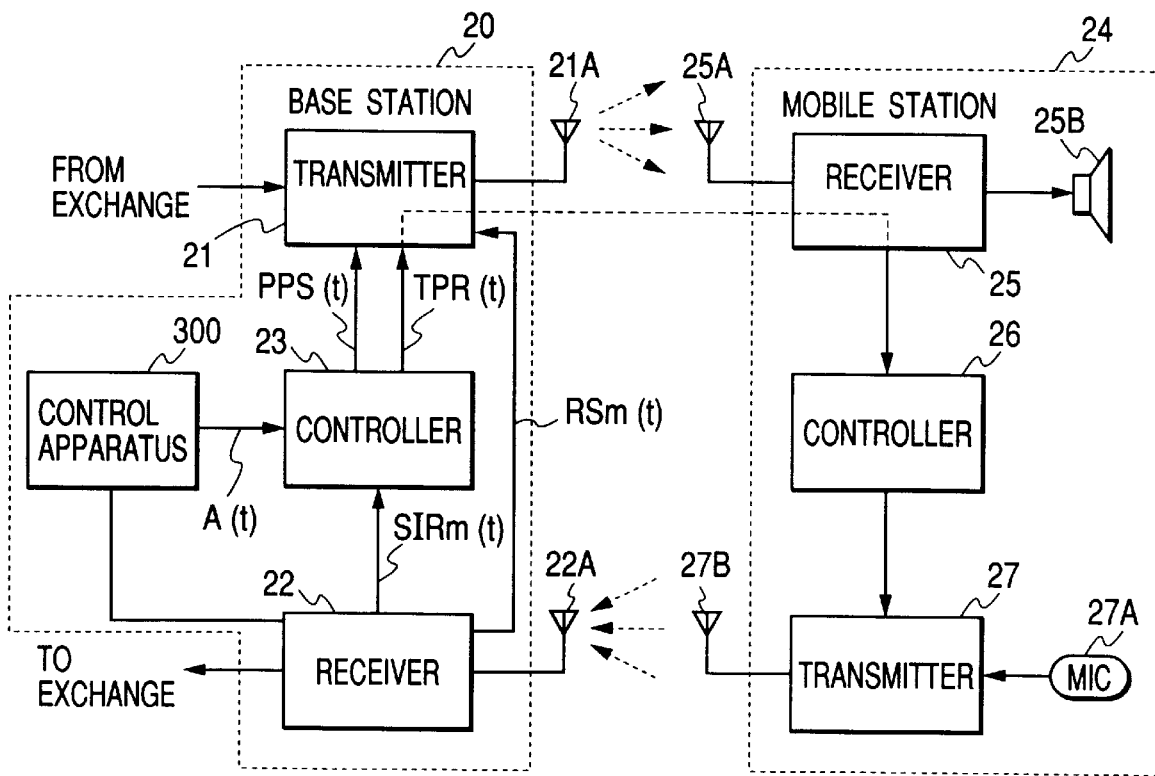
FIG. 6 is a block diagram of a base station and a mobile station in a CDMA mobile radio communication network according to the first embodiment of this invention.

FIG. 6 shows a base station 20 and a mobile station 24 in a CDMA mobile radio communication network. With reference to FIG. 6, the base station 20 is connected to an exchange system (an exchange network). The base station 20 includes a transmitter 21, a receiver 22, and a controller 23.

The receiver 22 in the base station 20 is connected to the exchange system. The receiver 22 is provided with an antenna 22A for catching uplink radio signals transmitted from mobile stations. The caught uplink radio signals are fed from the antenna 22A to the receiver 22. The receiver 22 discriminates or separates the uplink radio signals from each other according to spread code signals, and demodulates the uplink radio signals into digital audio signals respectively. The receiver 22 outputs the recovered digital audio signals to the exchange system.

The receiver 22 in the base station 20 periodically measures the powers (the strengths or the intensities) of received and separated uplink radio signals in channels corresponding to spread code signals respectively. The current measured powers of the received and separated uplink radio signals are demoted by $RSm(t)$, where $m=1, 2, \ldots, M$. The receiver 22 informs the transmitter 21 of the current measured powers $RSm(t)$ in the respective channels. In addition, the receiver 22 periodically measures the resultant power of the received uplink radio signals. Specifically, the receiver 22 periodically measures a received-signal power in a given frequency band used by CDMA. The current measured resultant power of the received uplink radio signals is denoted by $ZP(t)$. The receiver 22 periodically calculates the ratio of the measured power of each received and separated uplink radio signal to the measured resultant signal power $ZP(t)$, that is, the ratio of each measured 1-signal power to the measured resultant signal power $ZP(t)$ which is equal to a communication quality SIR. The current calculated communication qualities for the respective channels (the respective received and separated uplink radio signals) are denoted by $SIRm(t)$, where $m=1, 2, , \ldots, M$. The current calculated communication qualities $SIRm(t)$ are also referred to as the current measured communication qualities $SIRm(t)$. The receiver 22 informs the controller 23 of the current calculated communication qualities $SIRm(t)$. It should be noted that perfect power control gives the same SIR's for all mobile stations in a cell. The controller 23 in the base station 20 periodically receives, from a conventional or known control apparatus 300, information of the number of mobile stations in a cell related to the base station 20. The current mobile-station number is denoted by $A(t)$. The control apparatus 300 exists in the base station 20. The control apparatus 300 is connected to the receiver 22. The control apparatus 300 detects the current mobile-station number $A(t)$ on the basis of received-signal information fed by the receiver 22. The controller 23 periodically determines a designed pilot-signal power $PPS(t)$ and a desired received-signal power $TPR(T)$ in response to the current communication qualities $SIRm(t)$ and the current mobile-station number $A(t)$. The controller 23 informs the transmitter 21 of the designed pilot-signal power $PPS(t)$ and the desired received-signal power $TPR(t)$.

The transmitter 21 in the base station 20 is connected to the exchange system. The transmitter 21 receives digital audio signals from the exchange system. The transmitter 21 modulates and spreads the received digital audio signals into downlink radio signals according to different spread code signals respectively. The frequency spectrums of the downlink radio signals extend in a given frequency band used by CDMA, that is, extend in a common frequency band. The transmitter 21 combines the downlink radio signals into a resultant downlink radio signal. The transmitter 21 feeds the resultant downlink radio signal to an antenna 21A. The resultant downlink radio signal is radiated by the antenna 21A before being propagated to mobile stations. It should be noted that the antennas 21A and 22A may be common.

The transmitter 21 in the base station 20 converts pilot data into a corresponding RF spread spectrum signal referred to as an RF pilot signal. The transmitter 21 controls the power of the RF pilot signal in response to the designed pilot-signal power $PPS(t)$. Specifically, the transmitter 21 includes an RF amplifier operating on the RF pilot signal, and the RF amplifier is controlled in response to the designed pilot-signal power $PPS(t)$ so that an actual power of the RF pilot signal will be equal to the designed pilot-signal power $PPS(t)$. The transmitter 21 superimposes or multiplexes the RF pilot signal on or into the resultant downlink radio signal.

The transmitter 21 in the base station 20 is informed, by the receiver 22, of the measured powers of received and separated uplink radio signals in channels corresponding to spread code signals respectively, that is, corresponding to mobile stations respectively. The transmitter 21 compares the measured powers of the received and separated uplink radio signals with the desired received-signal power $TPR(t)$, and calculates the differences between the measured powers of the received and separated uplink radio signals and the desired received-signal power $TPR(t)$. The transmitter 21 generates transmission-power control signals for the mobile stations in response to the calculated differences respectively. The transmitter 21 multiplexes the transmission-power control signals and the corresponding digital audio signals, thereby superimposing the transmission-power control signals on the corresponding downlink radio signals respectively.

As shown in FIG. 6, the mobile station 24 includes a receiver 25, a controller 26, and a transmitter 27. The receiver 25 is connected to an antenna 25A for catching a downlink radio signal transmitted from a base station (for example, the base station 20). The caught downlink radio signal is fed from the antenna 25A to the receiver 25. The receiver 25 extracts a digital audio signal and a transmission-power control signal addressed to the mobile station 24 from the downlink radio signal through demodulating and despreading processes responsive to a spread code signal (a despread code signal) assigned to the mobile station 24. The receiver 25 includes a D/A converter which changes the digital audio signal into a corresponding analog audio signal. The receiver 25 is followed by a loudspeaker (or an earphone) 25B. The receiver 25 outputs the analog audio signal to the loudspeaker 25B. The loudspeaker 25B converts the analog audio signal into corresponding sound. The receiver 25 outputs the transmission-power control signal to the controller 26.

The transmitter 27 in the mobile station 24 follows a microphone 27A. The microphone 27A converts user's voice into a corresponding analog audio signal. The microphone 27A feeds the analog audio signal to the transmitter 27. The transmitter 27 includes an A/D converter which changes the analog audio signal into a corresponding digital audio signal. The transmitter 27 modulates the digital audio signal into a spread-spectrum uplink radio signal in response to the spread code signal assigned to the mobile station 24. The transmitter 27 is connected to an antenna 27B. The transmitter 27 feeds the spread-spectrum uplink radio signal to the antenna 27B. The spread-spectrum uplink radio signal is radiated by the antenna 27 before being propagated to the base station (for example, the base station 20). It should be noted that the antennas 25A and 27B may be common.

In the mobile station 24, the controller 26 is connected to the transmitter 27. Specifically, the controller 26 is connected to an RF power amplifier in the transmitter 27. The RF power amplifier operates on the spread-spectrum uplink radio signal. The controller 26 adjusts the RF power amplifier in response to the transmission-power control signal so that the power of the spread-spectrum uplink radio signal depends on the transmission-power control signal. Accordingly, the power of the spread-spectrum uplink radio signal in the mobile station 24 is controlled in response to the desired received-signal power TPR(t), the information of which is contained in the transmission-power control signal.

In this way, the transmission-power control is implemented mobile-station by mobile-station. In general, the transmission-power controls for the respective mobile stations are designed so that the powers of uplink radio signals received at the base station (for example, the base station 20) will converge on the desired received-signal power TPR(t).

Figure 7:
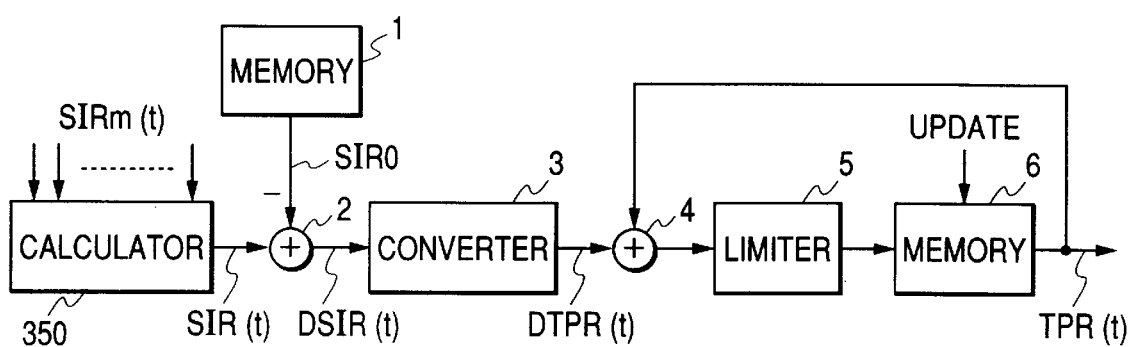
FIG. 7 is a block diagram of a first section of a controller in the base station of FIG. 6.

FIG. 7 shows a first section of the controller 23 in the base station 20. With reference to FIG. 7, the first section of the controller 23 includes a calculator 350 which receives the information of the current measured communication qualities SIRm(t) from the receiver 22 (see FIG. 6). The calculator 350 computes a current representative communication quality SIR(t) from the current measured communication qualities SIRm(t). For example, the calculator 350 averages the current measured communication qualities SIRm(t) into the current representative communication quality SIR(t). The current representative communication quality SIR(t) is also referred to as the current measured value SIR(t).

The section in FIG. 7 also includes a memory 1 and a subtracter 2. The memory 1 stores information of a predetermined reference value SIR0 for the representative communication quality SIR(t). The section in FIG. 7 implements steps for the control of the desired received-signal power so that the current measured value SIR(t) will converge on the reference value SIR0.

The subtracter 2 receives the information of the current measured value SIR(t) from the calculator 350. The subtracter 2 is connected to the memory 1. The subtracter 2 receives the information of the reference value SIR0 from the memory 1. The subtracter 2 calculates the difference DSIR(t) between the current measured value SIR(t) and the reference value SIR0 according to the following equation.

$$DSIR(t)=SIR(t)-SIR0$$

The section in FIG. 7 includes a converter 3 following the subtracter 2. The converter 3 changes the calculated difference DSIR(t) into an updating value or a variation value DTPR(t) for a desired received-signal power TPR(t). The relation between the calculated difference DSIR(t) and the updating value DTPR(t) is given as follows.

$$DTPR(t)=f\{DSIR(t)\}$$

where "f{ . . . }" denotes a predetermined conversion function being, for example, a proportional function or a step function.

It should be noted that the converter 3 includes, for example, a ROM designed for data conversion.

The section in FIG. 7 includes an adder 4 and a memory 6. The memory 6 stores information of the current desired received-signal power TPR(t). The adder 4 is connected to the converter 3 and the memory 6, and adds the current desired received-signal power TPR(t) and the updating value DTPR(t) into a basic new desired received-signal power TPR(t+1)BAS. The adder 4 is followed by a limiter 5. The limiter 5 sets the dynamic range of the desired received-signal power TPR. Specifically, the limiter 5 sets the upper limit and the lower limit of the desired received-signal power TPR. The device 5 limits the basic new desired received-signal power TPR(t+1)BAS to within the range between predetermined upper and lower limits, thereby modifying the basic new desired received-signal power TPR(t+1)BAS into a final new desired received-signal power TPR(t+1). The limiter 5 is followed by the memory 6. In the memory 6, information of the new desired received-signal power TPR(t+1) replaces the information of the current desired received-signal power TPR(t). In other words, the current desired received-signal power TPR(t) is updated into the new desired received-signal power TPR(t+1). The updating of the desired received-signal power TPR is iteratively implemented at a predetermined period in the range of, for example, several hundreds of milliseconds to several seconds. The memory 6 periodically outputs information of the desired received-signal power TPR(t) to the transmitter 21 (see FIG. 6).

As previously explained, the information of the power difference from the desired received-signal power TPR(t) is transmitted from the base station 20 to the corresponding mobile station as a transmission-power control signal in a downlink signal. The mobile station controls its transmission power in response to the received transmission-power control signal. The power control is designed to provide the following processes. When the current measured value SIR(t) decreases below the reference value SIR0 in the base station 20, the mobile station increases its transmission power in response to the power difference from the desired received-signal power TPR(t) to move later measured values SIR(t+1), SIR(t+2), . . . toward the reference value SIR0. When the current measured value SIR(t) increases above the reference value SIR0 in the base station, the mobile station decreases its transmission power in response to the power difference from the desired received-signal power TPR(t) to move later measured values SIR(t+1), SIR(t+2), . . . toward the reference value SIR0.

Figure 8:
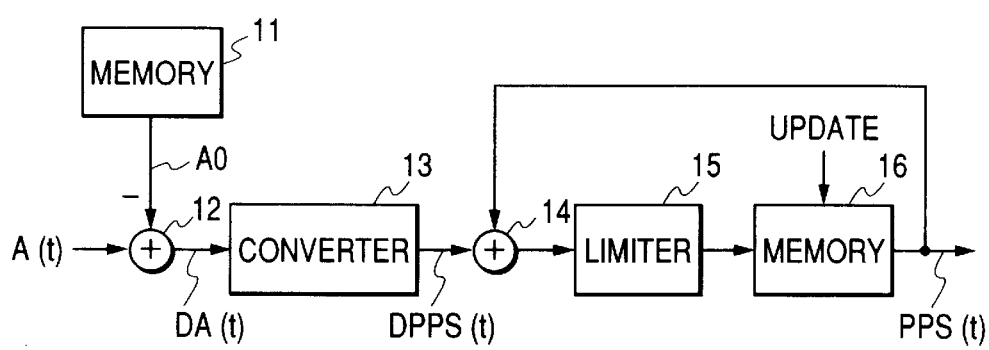
FIG. 8 is a block diagram of a second section of the controller in the base station of FIG. 6.

FIG. 8 shows a second section of the controller 23 in the base station 20. With reference to FIG. 8, the second section of the controller 23 receives the information of the current mobile-station number A(t) from the control apparatus 300 (see FIG. 6). The section in FIG. 8 includes a memory 11 and a subtracter 12. The memory 11 stores information of a predetermined reference number A0 for the mobile-station number. The section in FIG. 8 implements steps for pilot-signal power control in the transmitter 21 (see FIG. 6) which responds to the current mobile-station number A(t).

The subtracter 12 receives the information of the current mobile-station number A(t). The subtracter 12 is connected to the memory 11. The subtracter 12 receives the information of the reference number A0 from the memory 11. The subtracter 12 calculates the difference DA(t) between the current mobile-station number A(t) and the reference number A0 according to the following equation.

$$DA(t)=A(t)-A0 \tag{5}$$

The section in FIG. 8 includes a converter 13 following the subtracter 12. The converter 13 changes the calculated difference DA(t) into an updating value or a variation value DPPS(t) for a designed pilot-signal power PPS(t). The relation between the calculated difference DA(t) and the updating value DPPS(t) is given as follows.

$$DPPS(t)=g\{DA(t)\} \tag{6}$$

where "g{ . . . }" denotes a predetermined conversion function being, for example, a proportional function or a step function.

It should be noted that the converter 13 includes, for example, a ROM designed for data conversion.

The section in FIG. 8 includes an adder 14 and a memory 16. The memory 16 stores information of the current designed pilot-signal power PPS(t). The adder 14 is connected to the converter 13 and the memory 16, and adds the current designed pilot-signal power PPS(t) and the updating value DPPS(t) into a basic new designed pilot-signal power PPS(t+1)BAS. The adder 14 is followed by a limiter 15. The limiter 15 sets the dynamic range of the designed pilot-signal power PPS. Specifically, the limiter 15 sets the upper limit and the lower limit of the designed pilot-signal power PPS. The device 15 limits the basic new designed pilot-signal power PPS(t+1)BAS to within the range between predetermined upper and lower limits, thereby modifying the basic new designed pilot-signal power PPS(t+1)BAS into a final new designed pilot-signal power PPS(t+1). The limiter 15 is followed by the memory 16. In the memory 16, information of the new designed pilot-signal power PPS(t+1) replaces the information of the current designed pilot-signal power PPS(t). In other words, the current designed pilot-signal power PPS(t) is updated into the new designed pilot-signal power PPS(t+1). The updating of the designed pilot-signal power PPS is iteratively implemented at a predetermined period in the range of, for example, several seconds to several minutes. It is preferable that the period of the updating of the designed pilot-signal power PPS is significantly longer than the period of the updating of the desired received-signal power TPR. The memory 16 periodically outputs information of the designed pilot-signal power PPS(t) to the transmitter 21 (see FIG. 6).

Figure 26:
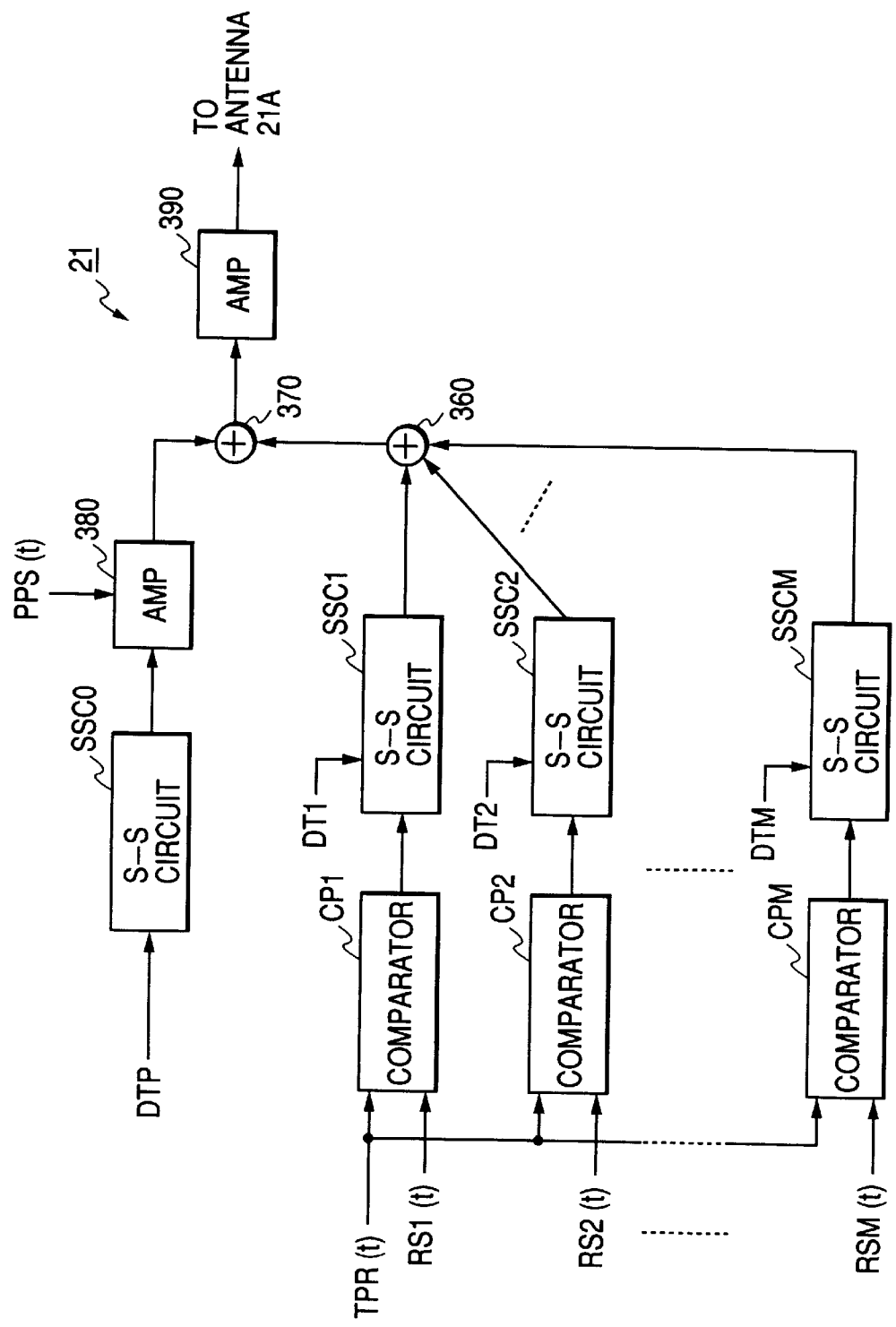
FIG. 26 is a block diagram of a portion of a transmitter in the base station of FIG. 6.

FIG. 26 shows a portion of the transmitter 21 (see FIG. 6).

With reference to FIG. 26, the transmitter 21 includes comparators (or subtracters) CP1, CP2, . . . , CPM for the respective channels. The comparators CP1, CP2, . . . , CPM receive the information of the desired received-signal power TPR(t) from the controller 23 (see FIG. 6). The comparators CP1, CP2, . . . , CPM are informed by the receiver 22 of the measured powers RS1(t), RS2(t), . . . , RSM(t) respectively. The comparators CP1, CP2, . . . , CPM calculate the differences between the desired received-signal power TPR(t) and the measured powers RS1(t), RS2(t), . . . , RSM(t) respectively. The comparators CP1, CP2, . . . , CPM inform spread-spectrum circuits SSC1, SSC2, . . . , SSCM of the calculated power differences as power control information pieces, respectively. The spread-spectrum circuits SSC1, SSC2, . . . , SSCM receive, from the exchange system, respective data pieces DT1, DT2, . . . , DTM to be transmitted. The data pieces DT1, DT2, . . . , DTM represent audio signals of the respective channels. The spread-spectrum circuits SSC1, SSC2, . . . , SSCN convert the data pieces DT1, DT2, . . . , DTM and the power control information pieces into RF spread-spectrum signals, respectively. The spread-spectrum circuits SSC1, SSC2, . . . , SSCM output the RF spread-spectrum signals to an adder 360. The RF spread-spectrum signals are combined by the adder 360 into a composite RF spread-spectrum signal. The adder 360 outputs the composite RF spread-spectrum signal to an adder 370.

With reference to FIG. 26, the transmitter 21 also includes a spread-spectrum circuit SSC0 receiving pilot data. The spread-spectrum circuit SSC0 converts the pilot data into a corresponding RF spread-spectrum signal referred to as an RF pilot signal. The spread-spectrum circuit SSC0 outputs the RF pilot signal to an RF amplifier 380. The RF amplifier 380 receives the information of the designed pilot-signal power PPS(t) from the controller 23 (see FIG. 6). The RF amplifier 380 enlarges the RF pilot signal in response to the designed pilot-signal power PPS(t). The RF amplifier 380 outputs the resultant RF pilot signal to the adder 370. The adder 370 superimposes or multiplexes the RF pilot signal on or into the composite RF spread-spectrum signal. The adder 370 outputs the resultant RF spread-spectrum signal to an RF power amplifier 390. The resultant RF spread-spectrum signal is enlarged by the RF power amplifier 390 before being fed to the antenna 21A.

Figure 9:
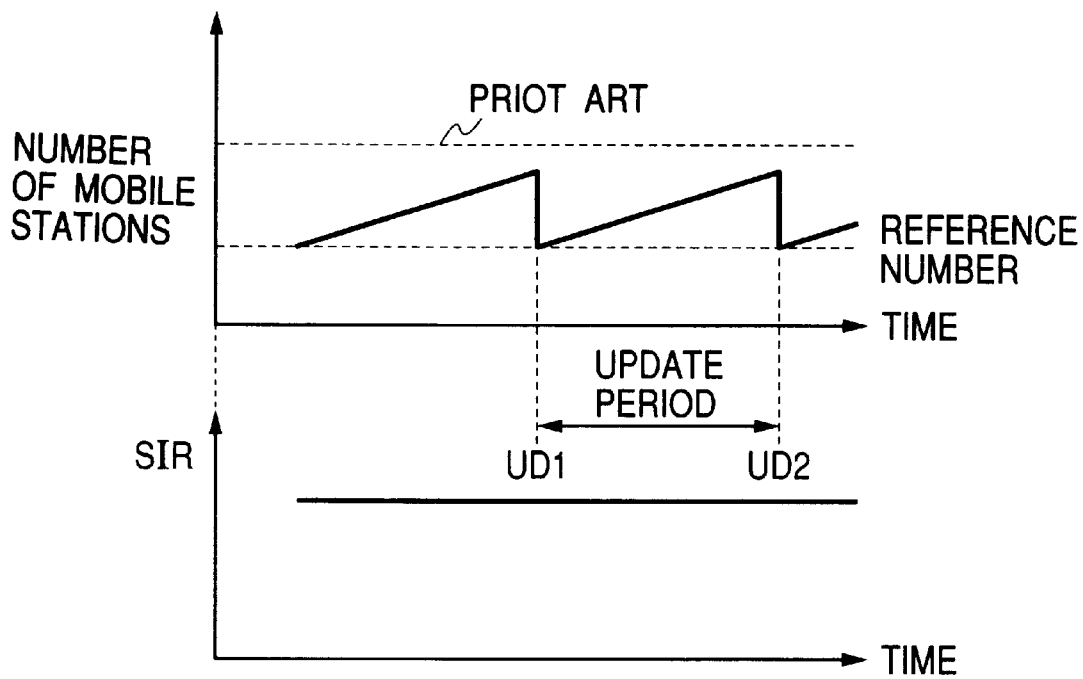
FIG. 9 is a time-domain diagram of the number of mobile stations and a communication quality (a signal-to-interference ratio) SIR which are provided in the first embodiment of this invention.

FIG. 9 shows conditions which occur in the case where the number of mobile stations in the cell (the cell related to the base station 20) monotonically increases in accordance with the lapse of time. With reference to FIG. 9, the mobile-station number A(t) exceeds the reference number A0 at a time point before a first updating moment UD1. At the first updating moment UD1, the mobile-station number A(t) is greater than the reference number A0, and hence the pilot-signal power is reduced so that the cell contracts. The contraction of the cell decreases the mobile-station number A(t) to the reference number A0. After the first updating moment UD1, the mobile-station number A(t) continues to increase. The mobile-station number A(t) exceeds the reference number A0 at a time point before a second updating moment UD2 following the first updating moment UD1. At the second updating moment UD2, the mobile-station number A(t) is greater than the reference number A0, and hence the pilot-signal power is reduced so that the cell contracts. The contraction of the cell decreases the mobile-station number A(t) to the reference number A0. As a result of these processes, the mobile-station number A(t) is prevented from increasing to an excessively large number at which communication qualities SIR's for uplink signals are unacceptably low. Thus, as shown in FIG. 9, a representative communication quality SIR continues to be equal to an acceptably high level.

It should be noted that the period of the updating of the designed pilot-signal power PPS may be varied in response to conditions of a change in the traffic.

In a modification of the first embodiment of this invention, the controller 23 receives the information of the measured resultant power ZP(t) from the receiver 22, and the representative communication quality SIR(t) is calculated from the desired received-signal power TPR(t) and the measured-resultant power ZP(t) according to the following equation.

$$SIR(t)=TPR(t)/ZP(t)$$

Second Embodiment

A second embodiment of this invention is similar to the first embodiment thereof except for design changes explained hereinafter. The second embodiment of this invention includes a section in FIG. 10 which replaces the section in FIG. 8.

Figure 10:
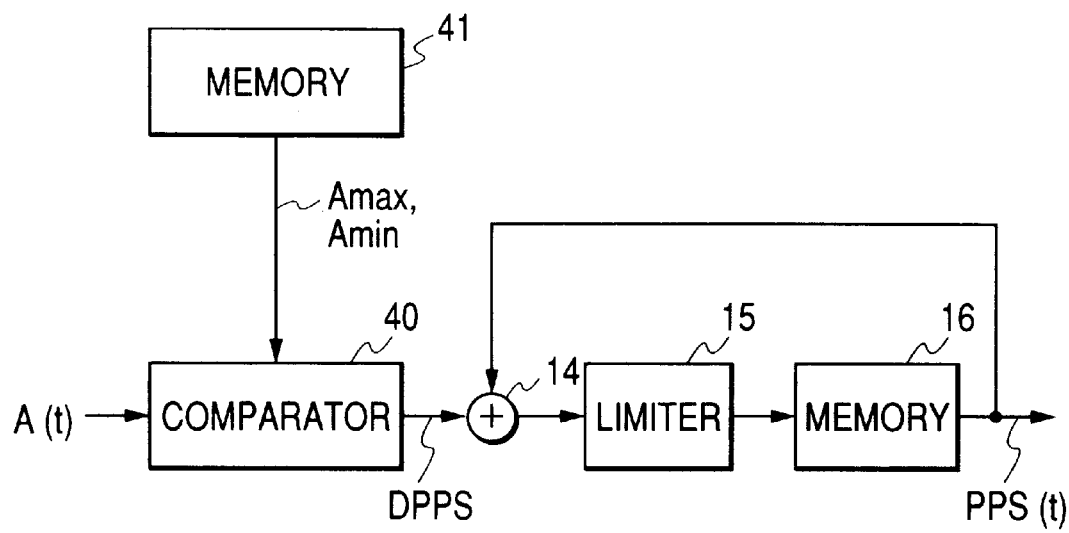
FIG. 10 is a block diagram of a section of a controller in a base station according to a second embodiment of this invention.

The section in FIG. 10 includes a comparator 40 and a memory 41. The memory 41 stores information of an allowable maximum mobile-station number Amax and an allowable minimum mobile-station number Amin which are predetermined. The allowable maximum number Amax is greater than the allowable minimum number Amin.

The comparator 40 receives the information of the current mobile-station number A(t) from the control apparatus 300 (see FIG. 6). The comparator 40 is connected to the memory 41. The comparator 40 receives the information of the allowable maximum number Amax and the allowable minimum number Amin from the memory 41. The device 40 compares the current mobile-station number A(t) with the allowable maximum number Amax and the allowable minimum number Amin. When the current mobile-station number A(t) is greater than the allowable maximum number Amax, the comparator 40 outputs information of a predetermined negative updating value or a predetermined negative variation value DPPS for a designed pilot-signal power PPS(t). When the current mobile-station number A(t) is smaller than the allowable minimum number Amin, the comparator 40 outputs information of a predetermined positive updating value or a predetermined positive variation value DPPS for the designed pilot-signal power PPS(t). When the current mobile-station number A(t) is between the allowable maximum number Amax and the allowable minimum number Amin, the comparator 40 outputs information of a zero updating value or a zero variation value DPPS for the designed pilot-signal power PPS(t).

The section in FIG. 10 includes an adder 14 and a memory 16. The memory 16 stores information of the current designed pilot-signal power PPS(t). The adder 14 is connected to the comparator 40 and the memory 16, and adds the current designed pilot-signal power PPS(t) and the updating value DPPS into a basic new designed pilot-signal power PPS(t+1)BAS. The adder 14 is followed by a limiter 15. The limiter 15 sets the dynamic range of the designed pilot-signal power PPS. Specifically, the limiter 15 sets the upper limit and the lower limit of the designed pilot-signal power PPS. The device 15 limits the basic new designed pilot-signal power PPS(t+1)BAS to within the range between predetermined upper and lower limits, thereby modifying the basic new designed pilot-signal power PPS(t+1)BAS into a final new designed pilot-signal power PPS(t+1). The limiter 15 is followed by the memory 16. In the memory 16, information of the new designed pilot-signal power PPS(t+1) replaces the information of the current designed pilot-signal power PPS(t). In other words, the current designed pilot-signal power PPS(t) is updated into the new designed pilot-signal power PPS(t+1). The memory 16 periodically outputs information of the designed pilot-signal power PPS(t) to the transmitter 21 (see FIG. 6).

Figure 11:
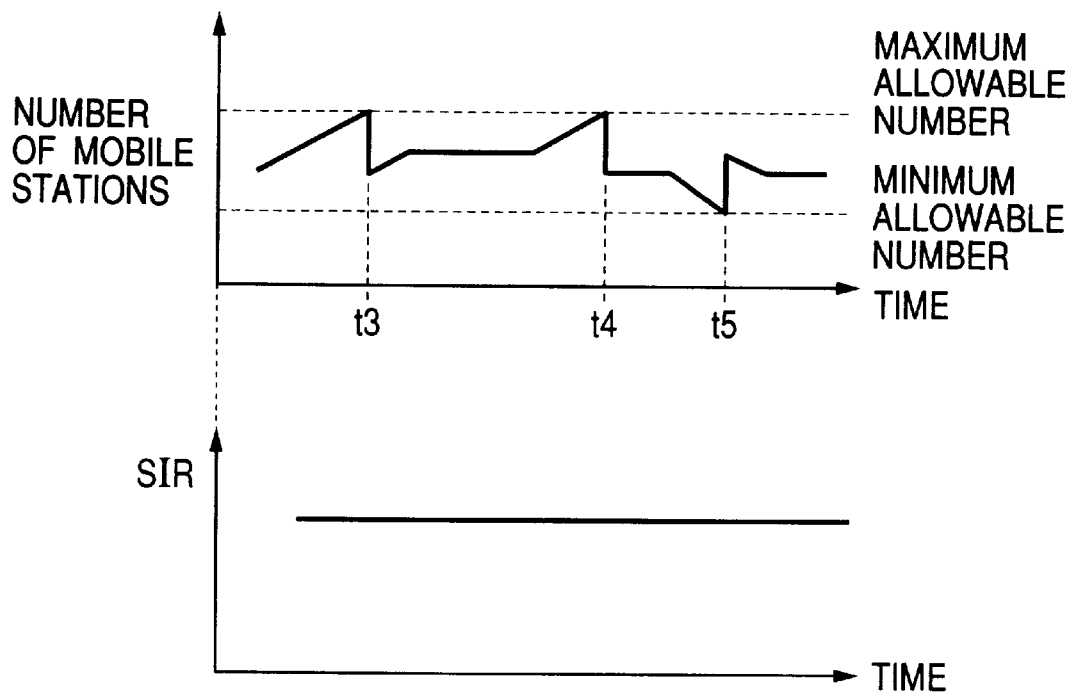
FIG. 11 is a time-domain diagram of the number of mobile stations and a communication quality (a signal-to-interference ratio) SIR which are provided in the second embodiment of this invention.

With reference to FIG. 11, at a moment t3, the mobile-station number A(t) increases above the allowable maximum number Amax, and hence the pilot-signal power is reduced so that the cell contracts. The contraction of the cell decreases the mobile-station number A(t). At a moment t4 following the moment t3, the mobile-station number A(t) increases above the allowable maximum number Amax, and hence the pilot-signal power is reduced so that the cell contracts. The contraction of the cell decreases the mobile-station number A(t). At a moment t5 following the moment t4, the mobile-station number A(t) decreases below the allowable minimum number Amin, and hence the pilot-signal power is increased so that the cell expands. The expansion of the cell increases the mobile-station number A(t). As a result of these processes, the mobile-station number A(t) is maintained in an allowable range.

Third Embodiment

A third embodiment of this invention is similar to the first embodiment thereof except for design changes explained hereinafter. The third embodiment of this invention includes a section in FIG. 12 which replaces the section in FIG. 8.

Figure 12:
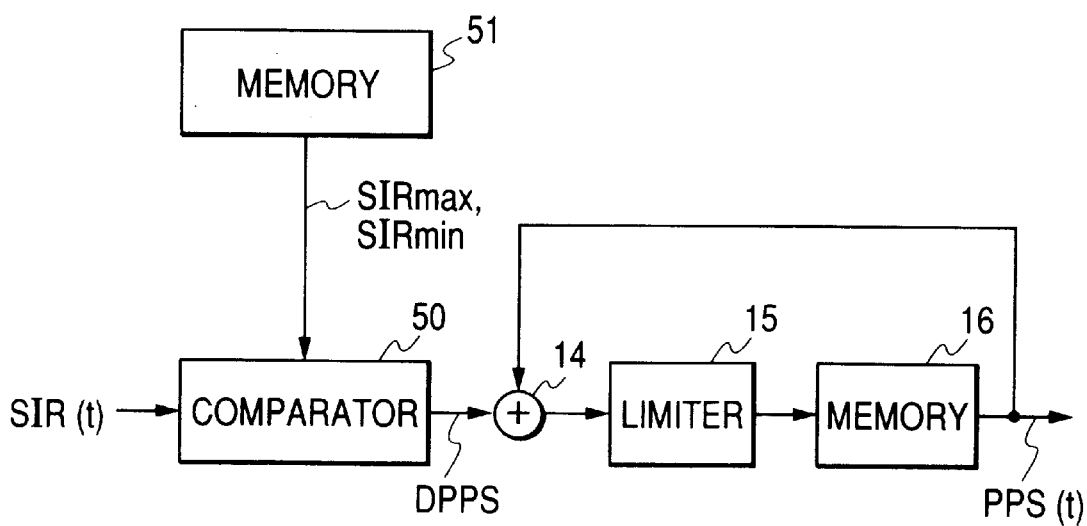
FIG. 12 is a block diagram of a section of a controller in a base station according to a third embodiment of this invention.

The section in FIG. 12 includes a comparator 50 and a memory 51. The memory 41 stores information of an allowable maximum value SIRmax and an allowable minimum value SIRmin for a communication quality SIR. The allowable maximum value SIRmax and the allowable minimum value SIRmin are predetermined. The allowable maximum value SIRmax is greater than the allowable minimum value SIRmin.

For example, the comparator 50 follows a calculator (for example, the calculator 350 in FIG. 7) receiving the output signals of the receiver 22 (see FIG. 6) which represent the current measured values of the communication qualities SIR's related to the respective channels. The calculator computes a mean value or an average value among the current measured values of the communication qualities SIR's. The calculator informs the comparator 50 of the calculated mean value (the calculated average value) as a current measured value SIR(t). Thus, the comparator 50 receives the information of the current measured value SIR(t). The comparator 50 is connected to the memory 51. The comparator 50 receives the information of the allowable maximum value SIRmax and the allowable minimum value SIRmin from the memory 51. The device 50 compares the current measured value SIR(t) with the allowable maximum value SIRmax and the allowable minimum value SIRnin. When the current measured value SIR(t) is greater than the allowable maximum value SIRmax, the comparator 50 outputs information of a predetermined negative updating value or a predetermined negative variation value DPPS for a designed pilot-signal power PPS(t). In this case, the actual pilot-signal power is reduced. When the current measured value SIR(t) is smaller than the allowable minimum value SIRmin, the comparator 50 outputs information of a predetermined positive updating value or a predetermined positive variation value DPPS for the designed pilot-signal power PPS(t). In this case, the actual pilot-signal power is increased. When the current measured value SIR(t) is between the allowable maximum value SIRmax and the allowable minimum value SIRmin, the comparator 50 outputs information of a zero updating value or a zero variation value DPPS for the designed pilot-signal power PPS(t). In this case, the actual pilot-signal power is held unchanged.

Fourth Embodiment

A fourth embodiment of this invention is similar to the first embodiment thereof except for design changes explained hereinafter. The fourth embodiment of this invention includes a section in FIG. 13 which replaces the section in FIG. 8.

Figure 13:
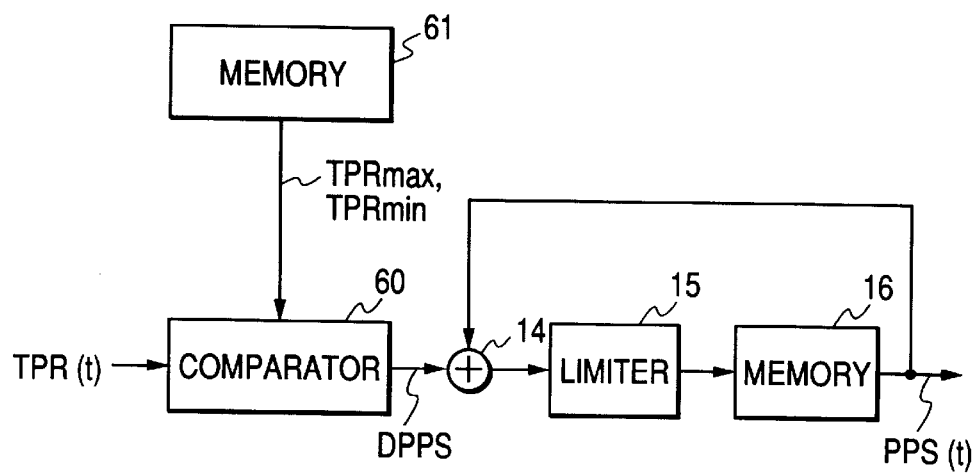
FIG. 13 is a block diagram of a section of a controller in a base station according to a fourth embodiment of this invention.

The section in FIG. 13 includes a comparator 60 and a memory 61. The memory 61 stores information of an allowable maximum value TPRmax and an allowable minimum value TPRmin for a current desired received-signal power TPR(t). The allowable maximum value TPRmax and the allowable minimum value TPRmin are predetermined. The allowable maximum value TPRmax is greater than the allowable minimum value TPRmin.

For example, the comparator 60 follows the section in FIG. 7. The comparator 60 receives the output signal of the section in FIG. 7 which represents the current desired received-signal power TPR(t). Thus, the comparator 60 receives the information of the current desired received-signal power TPR(t). The comparator 60 is connected to the memory 61. The comparator 60 receives the information of the allowable maximum value TPRmax and the allowable minimum value TPRmin from the memory 61. The device 60 compares the current desired received-signal power TPR(t) with the allowable maximum value TPRmax and the allowable minimum value TPRmin. When the current desired received-signal power TPR(t) is greater than the allowable maximum value TPRmax, the comparator 60 outputs information of a predetermined negative updating value or a predetermined negative variation value DPPS for a designed pilot-signal power PPS(t). In this case, the actual pilot-signal power is reduced. When the current desired received-signal power TPR(t) is smaller than the allowable minimum value TPRmin, the comparator 60 outputs information of a predetermined positive updating value or a predetermined positive variation value DPPS for the designed pilot-signal power PPS(t). In this case, the actual pilot-signal power is increased. When the current desired received-signal power TPR(t) is between the allowable maximum value TPRmax and the allowable minimum value TPRmin, the comparator 60 outputs information of a zero updating value or a zero variation value DPPS for the designed pilot-signal power PPS(t). In this case, the actual pilot-signal power is held unchanged.

Fifth Embodiment

A fifth embodiment of this invention is similar to one of the first, second, third, and fourth embodiments thereof except for design changes explained hereinafter. The fifth embodiment of this invention includes a section in FIG. 14 which replaces the section in FIG. 7.

Figure 14:
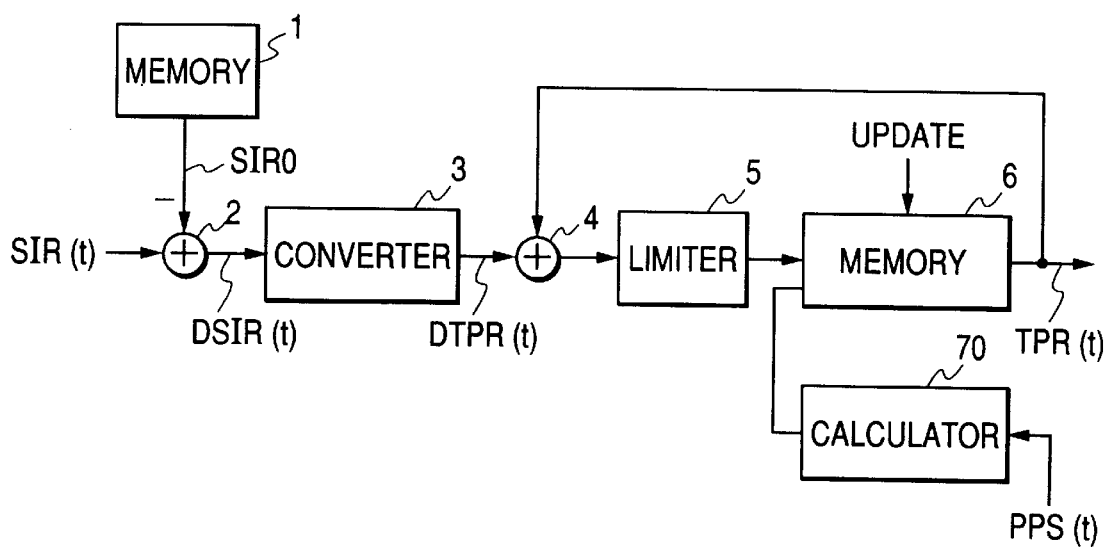
FIG. 14 is a block diagram of a section of a controller in a base station according to a fifth embodiment of this invention.

The section in FIG. 14 includes a calculator 70 receiving the information of the current designed pilot-signal power PPS(t) from the section in FIG. 8, FIG. 10, FIG. 12, or FIG. 13. The calculator 70 computes a corrective quantity for the current desired received-signal power TPR(t) on the basis of the current designed pilot-signal power PPS(t). The calculator 70 is connected to the memory 6.The calculator 70 reads out information of the current desired received-signal power TPR(t) from the memory 6. The calculator 70 corrects the current desired received-signal power TPR(t) in response to the corrective quantity. The calculator 70 replaces the information of the current desired received-signal power TPR(t) in the memory 6 by information of the correction-resultant desired received-signal power.

Thus, the current desired received-signal power TPR(t) is corrected in response to the current designed pilot-signal power PPS(t). This correction is designed so that the product of the desired received-signal power TPR and the designed pilot-signal power PPS will remain equal to a given constant value.

Sixth Embodiment

With reference to FIG. 15, a CDMA cellular mobile radio communication network has base stations including adjacent base stations BS0, BS1, and BS2. The whole area covered by the CDMA cellular mobile radio communication network is divided into cells in which the base stations are located respectively. The base stations BS0, BS1, and BS2 transmit downlink pilot radio signals respectively.

As shown in FIG. 15, regarding the base station BS0, the power RP0 of the downlink pilot radio signal received at a mobile station drops as the mobile station is more distant from the base station BS0. Regarding the base station BS1, the power RP1 of the downlink pilot radio signal received at a mobile station drops as the mobile station is more distant from the base station BS1. Regarding the base station BS2, the power RP2 of the downlink pilot radio signal received at a mobile station drops as the mobile station is more distant from the base station BS2.

In general, a mobile station receives downlink pilot radio signals from plural base stations, and detects the powers (the strengths) of the received downlink pilot radio signals. The mobile station compares the detected powers of the received downlink pilot radio signals with each other, and selects one from among the plural base stations which relates to the greatest of the detected powers of the received downlink pilot radio signals. The mobile station is designed so that it will connect with the selected base station with first priority.

Accordingly, with reference to FIG. 15, the boundary CL0-1 between the cells related to the base stations BS0 and BS1 is a place at which the distance-dependent power RP0 of the downlink pilot radio signal from the base station BS0 and the distance-dependent power RP1 of the downlink pilot radio signal from the base station BS1 are equal to each other. Similarly, the boundary CL1-2 between the cells related to the base stations BS1 and BS2 is a place at which the distance-dependent power RP1 of the downlink pilot radio signal from the base station BS1 and the distance-dependent power RP2 of the downlink pilot radio signal from the base station BS2 are equal to each other.

It is assumed that plural mobile stations are within the cell related to the base station BS1 and are connected therewith. The base station BS1 monitors the quality (the SIR) of communications with the mobile stations. When the monitored quality of communications drops below a predetermined reference level, the base station BS1 lowers the transmission power PPS1 of its downlink pilot radio signal. As a result, the cell related to the base station BS1 contracts while the cells related to the base stations BS0 and BS2 expand, and one or more mobile stations are placed from the cell related to the base station BS1 to the cells related to the base stations BS0 and BS2. In other words, hand-off is implemented with respect to one or more mobile stations. Thus, there occurs a decrease in the number "A" of mobile stations in the cell related to the base station BS1, and the communication quality SIR increases. In this way, the previously-indicated drop in the quality (the SIR) of communications between the base station BS1 and the mobile stations is compensated.

With reference to FIG. 16, desired powers of received radio signals at base stations BS0, BS1, and BS2 are denoted by TPR0, TPR1, and TPR2 respectively. A mobile-station transmission power to attain the desired received-signal power TPR0 is denoted by TM0. Mobile-station transmission powers to attain the desired received-signal powers TPR1 and TPR2 are denoted by TM1 and TM2 respectively.

According to the function provided by a power control system, the uplink signal transmission power TM0 in a mobile station connecting with the base station BS0 increases as the mobile station is more distant from the base station BS0. Similarly, the uplink signal transmission power TM1 in a mobile station connecting with the base station BS1 increases as the mobile station is more distant from the base station BS1. In addition, the uplink signal transmission power TM2 in a mobile station connecting with the base station BS2 increases as the mobile station is more distant from the base station BS2.

In the case where the base station BS1 lowers the transmission power PPS1 of its downlink pilot radio signal so that the cell related to the base station BS1 contracts and the inter-cell boundaries CL0-1 and CL1-2 move toward the base station BS1, the uplink signal transmission powers TM0 and TM2 in mobile stations connected to the base stations BS0 and BS2 and located near the cell boundaries CL0-1 and CL1-2 are relatively great. The great uplink signal transmission powers TM0 and TM2 might intensify interferences with the base station BS1. To prevent the occurrence of such a problem, the base station BS1 increases the desired received-signal power TPR1. As the desired received-signal power TRP1 is increased, communications between the base station BS1 and mobile stations are less adversely affected by the mobile stations connected to the base stations BS0 and BS2.

Figure 17:
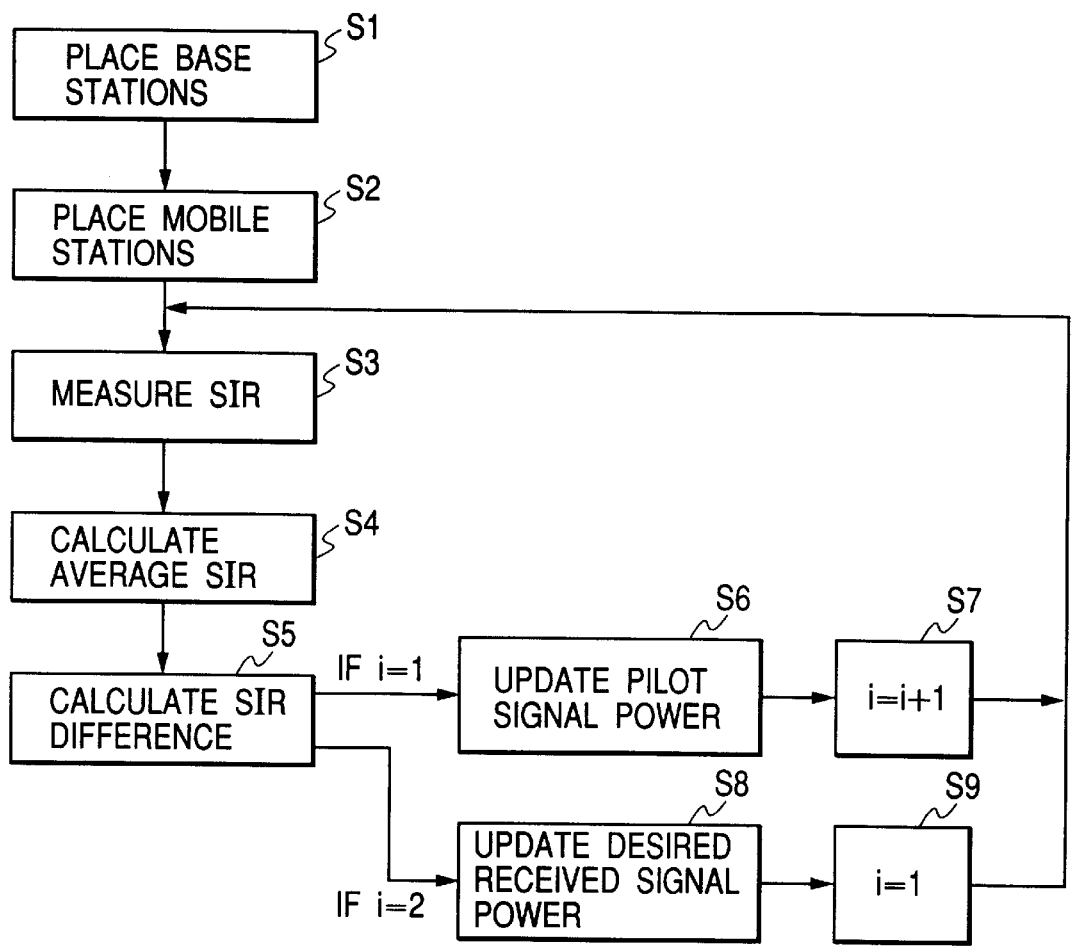
FIG. 17 is a flow diagram of a sequence of steps in a method of determining the cell structure of a CDMA cellular mobile radio communication network according to a sixth embodiment of this invention.

FIG. 17 shows a sequence of steps in a method of determining the cell structure of a CDMA cellular mobile radio communication network. The step sequence in FIG. 17 is implemented when a CDMA cellular mobile radio communication network is designed. The step sequence in FIG. 17 may be implemented after the start of operation of the CDMA cellular mobile radio communication network. In general, the parameters of base stations are determined during the implementation of the step sequence in FIG. 17.

The placement of the base stations is decided by a known way before the step sequence in FIG. 17 is implemented. Also, the distribution of the numbers of mobile stations are detected in a known way. Furthermore, the losses of signal propagations between the base stations and the mobile stations are previously detected by, for example, an investigation of electric-field strengths. Specifically, the step sequence in FIG. 17 is implemented through simulation.

Figure 18:
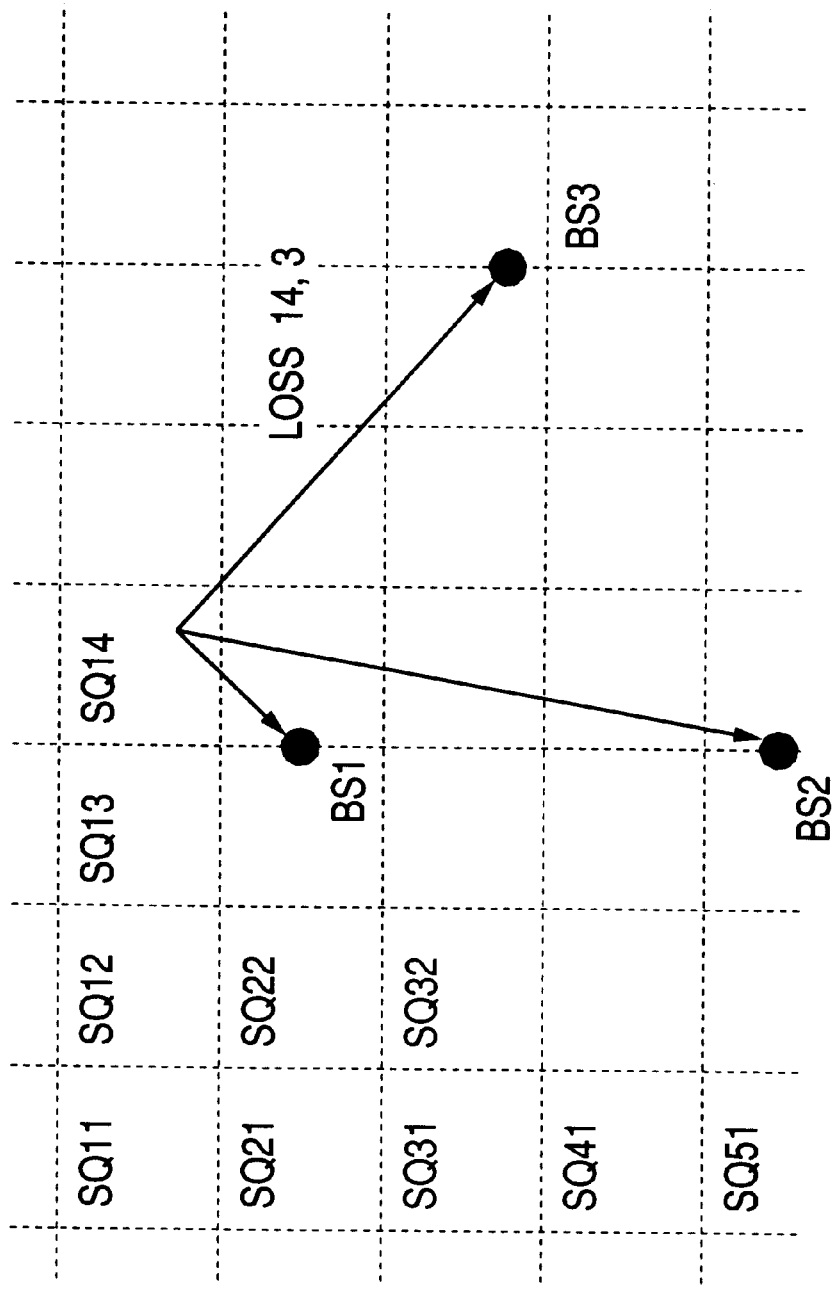
FIG. 18 is a diagram of sub-areas (squares) composing the area covered by a CDMA cellular mobile radio communication network, and base stations.

As shown in FIG. 18, the whole area covered by the CDMA cellular mobile radio communication network is divided into sub-areas or small equal-size squares denoted by SQ1, SQ2, ..., SQk, ..., SQN, respectively. Thus, k=1, 2, ... N. It is assumed that each of the squares SQk is free from a non-uniform distribution of mobile stations. Also, a mean of the number of mobile stations in each of the squares SQk (k=1, 2, ... N) is known. In addition, the losses "Loss_km" of signal propagations between base stations and mobile stations in the squares SQk (k=1, 2, ..., N) are previously detected by, for example, a measurement process. The base stations are denoted by BS1, BS2, ..., BSm, ..., BSM, respectively. Thus, m=1, 2, ..., M. The structure in FIG. 18 is a simulation model. In actual environments, sub-areas may be different in shape and size since they are formed according to the configuration of the ground, buildings, and other factors.

With reference to FIG. 17, in a first step S1, the base stations BSm (m=1, 2, ..., M) are placed on the simulation model in FIG. 18. In a step S2 following the step S1, mobile stations are placed on the simulation model according to mobile-station distributions in the squares SQk (k=1, 2, ..., N).

Then, an advance from the step S2 to a step S3 is done. During the first execution of the step S3, predetermined initial values of pilot-signal transmission powers PPS1, PPS2, ..., PPSm, ..., PPSM are given to the base stations BS1, BS2, ..., BSm, ..., BSM, respectively. In the step S3, a decision is made as to a base station with which each of the mobile stations should connect on the basis of the pilot-signal transmission powers PPS1, PPS2, ..., PPSm, ..., PPSM in the respective base stations BS1, BS2, ..., BSm, ..., BSM.

During the first execution of the step S3, predetermined initial values of desired uplink received-signal powers TPR1, TPR2, ..., TPRm, ..., TPRM are given to the base stations BS1, BS2, BSm, ..., BSM, respectively. In addition, transmission powers in the mobile stations are decided so as to attain the desired uplink received-signal powers, respectively. Furthermore, SIR's (that is, communication qualities) for uplink signals received by the base stations are calculated on the basis of the transmission powers in the mobile stations. Specifically, the calculation of each communication quality SIR is implemented according to the following equation.

$$SIR = S/(A \cdot S + B) \quad (7)$$

$$= S \bigg/ \bigg\{ NG \cdot S + \sum_{m=1}^{M(m \neq G)} \sum_{j=1}^{Nm} (Pt\_mj \cdot Loss\_kG) \bigg\}$$

where "S" denotes the desired uplink received-signal power; "A" denotes the number of other mobile stations in the cell of interest; "B" denotes the total amount of interferences with the cell of interest which are caused by adjacent cells; and "Nm" denotes the number of mobile stations in each cell. The mobile-station number Nm varies from cell to cell. A base station currently subjected to measurement is denoted by BSG. In the equation (7), "NG" denotes the number of mobile stations connecting with the present base station BSG, and "Pt_mj" denotes transmission powers in mobile stations in adjacent cells. The transmission powers in the mobile stations are controlled by base stations with which the mobile stations connect. In the equation (7), "Loss_kG" denotes the loss of signal propagation between a mobile station in a square SQk and the base station BSG currently subjected to measurement. The signal propagation loss "Loss_kG" is previously detected by, for example, a measurement process.

According to the equation (7), the amount of interferences with the cell of interest are estimated in view of all the other cells, that is, the (M−1) cells. The amount of interferences with the cell of interest may be estimated in view of a less number of other cells from which a cell or cells causing weak interferences (negligible interferences) are excluded.

In the step S3, such calculation of a communication quality SIR is executed for each of the base stations BS1, BS2, ..., BSm, ..., BSM. The calculated communication qualities SIR's for the base stations BS1, BS2, ..., BSm, ..., BSM are denoted by SIR1, SIR2, ..., SIRm, ..., SIRM, respectively.

A step S4 following the step S3 calculates a mean value or an average value SIRav among the communication qualities SIR1, SIR2, ..., SIRm, ..., SIRM. A step S5 subsequent to the step S4 calculates the differences D_SIRm (m=1, 2, ..., M) between the average value SIRav and the communication qualities SIRm (m=1, 2, ..., M). For example, regarding the base station BSG, calculation of the difference D_SIRG between the average value SIRav and the communication quality SIRG is implemented according to the following equation.

$$D\_SIRG = SIRG - SIRav \quad (8)$$

A decision is made as to whether or not all the communication quality differences D_SIRm (m=1, 2, ..., M) are equal to zero or small values, and are hence substantially equivalent to the average value SIRav. When it is decided that all the communication quality differences D_SIRm (m=1, 2, ..., M) are substantially equivalent to the average value SIRav, the pilot-signal transmission powers PPSm (m=1, 2, ..., M) and the desired uplink received-signal powers TPRm (m=1, 2, ..., M) are set as final designed pilot-signal transmission powers and final desired uplink received-signal powers regarding the base stations BSm (m=1, 2, ..., M). Thus, in this case, the pilot-signal transmission powers PPSm (m=1, 2, ..., M) and the desired uplink received-signal powers TPRm (m=1, 2, ..., M) are not updated.

On the other hand, when it is decided that at least one of the communication quality differences D_SIRm (m=1, 2, . . . , M) is not substantially equivalent to the average value SIRav, the pilot-signal transmission powers PPSm (m=1, 2, . . . , M) or the desired uplink received-signal powers TPRm (m=1, 2 . . . , M) are updated.

A flag "i" is provided to designate the object to be updated. The flag "i" is either "1" or "2". When the flag "i" is "1", the updating of the pilot-signal transmission powers PPSm (m=1, 2, . . . , M) is implemented. When the flag "i" is "2", the updating of the desired uplink received-signal powers TPRm (m=1, 2, . . . , M) is implemented. For example, an initial value of the flag "i" is "1". When the step S5 is executed for the first time, an advance from the step S5 to a step S6 is usually done.

In the step S6, the pilot-signal transmission powers PPSm (m=1, 2, . . . , M) are updated in response to the differences D_SIRm (m=1, 2, . . . , M) regarding the base stations BSm (m=1, 2, . . . , M). For example, regarding the base station BSG, the updating of the pilot-signal transmission power PPSG is implemented according to the following equation.

$$PPSG = PPSGA\char`^ + \alpha 1 \cdot D\_SIRG \qquad (9)$$

where PPSGA^ denotes the pilot-signal transmission power which occurs before the updating, and "α1" denotes an updating coefficient. It is preferable that the updating coefficient "α1" is equal to a predetermined small value.

The step S6 is followed by a step S7 which adds "1" to the flag "i". Therefore, the flag "i" is changed from "1" to "2". After the step S7, a return to the step S3 is done. In the step S3, the mobile stations are re-connected with the base stations while the update-resultant pilot-signal transmission powers PPSm (m=1, 2, . . . , M) are used. In addition, measurement is made as to the uplink communication qualities SIRm regarding the base stations BSm.

Subsequently, in the step S4, a new communication quality average value SIRav is calculated from the new measured values SIRm. Then, the step S5 calculates the differences D_SIRm (m=1, 2, . . . , M) between the new average value SIRav and the new communication qualities SIRm (m=1, 2, . . . , M) regarding the base stations BSm (m=1, 2, . . . , M). A decision is made as to whether or not all the communication quality differences D_SIRm (m=1, 2, . . . , M) are substantially equivalent to the average value SIRav. When it is decided that at least one of the communication quality differences D_SIRm (m=1, 2, . . . , M) is not substantially equivalent to the average value SIRav, the desired uplink received-signal powers TPRm (m=1, 2, . . . , M) are updated as explained later. Since the flag "i" is "2", an advance from the step S5 to a step S8 is usually done.

In the step S8, the desired uplink received-signal powers TPRm (m=1, 2, . . . , M) are updated in response to the new differences D_SIRm (m=1, 2, . . . , M) regarding the base stations BSm (m=1, 2, . . . , M). For example, regarding the base station BSG, the updating of the desired uplink received-signal power TPRG is implemented according to the following equation.

$$TPRG = TPRGA\char`^ + \alpha 2 \cdot D\_SIRG \qquad (10)$$

where TPRG^ denotes the desired uplink received-signal power which occurs before the updating, and "α2" denotes an updating coefficient. It is preferable that the updating coefficient "α2" is equal to a predetermined small value. The updating coefficient "α2" may be equal to the updating coefficient "α1".

The step S8 is followed by a step S9 which sets the flag "i" to "1". After the step S9, a return to the step S3 is done.

In the step S3, the transmission powers in the mobile stations are updated so that actual uplink received-signal powers in the base stations BSm will be substantially equal to the desired uplink received-signal powers TPRm given by the step S8. In addition, measurement is made as to the uplink communication qualities SIRm regarding the base stations BSm. Then, the above-mentioned processes are iterated until the communication quality differences D_SIRm regarding the base stations BSm are nullified or become negligible. The pilot-signal transmission powers PPSm (m=1, 2, . . . , M) and the desired uplink received-signal powers TPRm (m=1, 2, . . . , M), which are finally available, are used as designing values for the base stations BSm (m=1, 2, . . . , M).

The use of these designing values makes it possible to reduce communication quality variations (differences) among the base stations which are caused by a non-uniform traffic distribution. The above-mentioned method of determining the cell structure reduces variations among the numbers of mobile stations managed by the base stations. Thus, regarding the base stations, it is easy to design the radio unit number (the maximum number of connectable mobile stations).

The distribution of mobile stations tends to be time-dependent or day-dependent. For example, the distribution of mobile stations at daytime generally differs from that at night. The distribution of mobile stations on weekdays generally differs from that on weekends. In such a case, typical distributions of mobile stations are previously decided, and the above-mentioned designing values are calculated according to the typical distributions of mobile stations. In this case, the actually-used designing values are changed among the calculated designing values on a time-dependent basis or a day-dependent basis.

It is assumed that after operation of the CDMA cellular mobile radio communication network is started, the distribution of mobile stations and the conditions of signal propagations change from those available at the time of designing. In this case, processes similar to the above-mentioned processes are implemented to change the parameters of the base stations, and thereby the cell structure of the CDMA cellular mobile radio communication network is updated to follow the changes in the distribution of mobile stations and the conditions of signal propagations.

Figure 25:
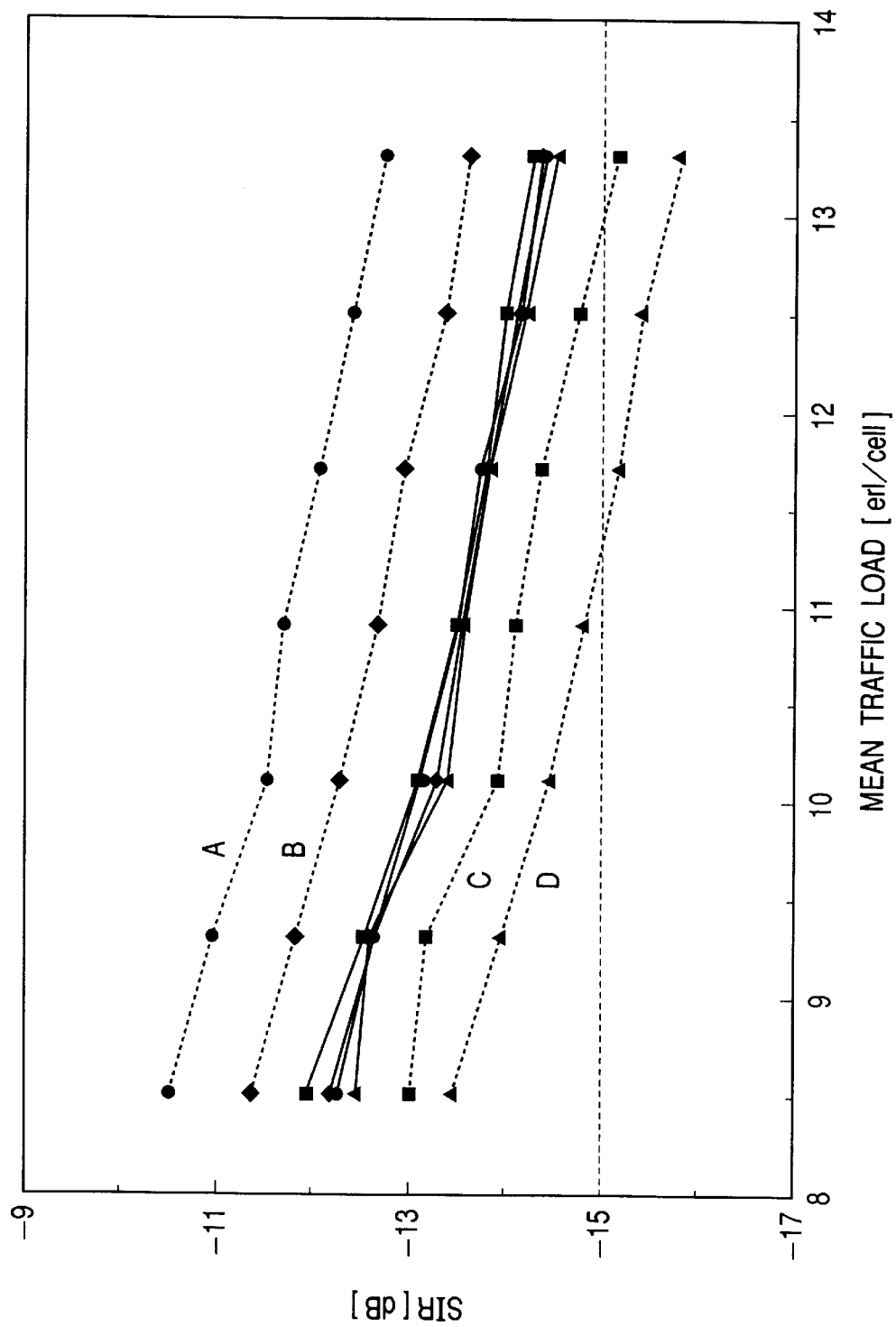
FIG. 25 is a diagram of the relations between mean communication qualities (mean signal-to-interference ratios) SIR's and mean traffics which are provided in the sixth embodiment of this invention.

FIG. 25 shows simulation results which are obtained under conditions where the distribution of mobile stations is assumed to be uniform, and the positions of base stations are dispersed or scattered. In FIG. 25, the abscissa denotes a mean traffic load per cell, and the ordinate denotes a mean communication quality SIR regarding each of base stations "A", "B", "C", and "D". The dot lines denote the relations between the mean traffics and the mean communication qualities which are available in the case where pilot-signal transmission powers in the base stations "A", "B", "C", and "D" are equal to each other, and desired uplink received-signal powers regarding the base stations "A", "B", "C", and "D" are equal to each other. On the other hand, the solid lines denote the relations between the mean traffics and the mean communication qualities which are available in the case where the pilot-signal transmission powers and the desired uplink received-signal powers are determined according to the designing in this embodiment.

As shown in FIG. 25, in the case where the pilot-signal transmission powers are equal to each other and the desired uplink received-signal powers are equal to each other, the differences in communication quality SIR among the base stations "A", "B", "C", and "D" extend up to about 3 dB. Now, a threshold value for the mean communication qualities SIR's is set to −15 dB. Regarding the base station "C", the mean communication quality drops below the threshold value when the mean traffic increases above 13 [erl/cell]. Regarding the base station "D", the mean communication quality drops below the threshold value when the mean traffic increases above 11.2 [erl/cell]. On the other hand, the base stations "A" and "B" have surpluses in mean communication quality.

As shown in FIG. 25, in the case where the pilot-signal transmission powers and the desired uplink received-signal powers are determined according to the designing in this embodiment, the mean communication qualities SIR's regarding the respective base stations "A", "B", "C", and "D" are approximately equal to each other.

Seventh Embodiment

A seventh embodiment of this invention Is similar to the sixth embodiment thereof except for design changes explained later. The seventh embodiment of this invention considers the case where the distribution of mobile stations can not be predicted at a stage of designing, or signal propagations can not be measured at the stage of designing. Also, the seventh embodiment of this invention considers the case where although the designing values given in the sixth embodiment of this invention are used, the actual values (the measured values) of the communication qualities are significantly different from the desired values (the expected values) thereof due to, for example, the occurrence of unpredicted errors. Furthermore, the seventh embodiment of this invention considers the case where after the base stations are actually provided, a new building is constructed and hence the conditions of signal propagations change or the distribution of mobile stations changes.

In the seventh embodiment of this invention, the processes in FIG. 17 are implemented while the CDMA cellular mobile radio communication network remains actually operated.

Figure 19:
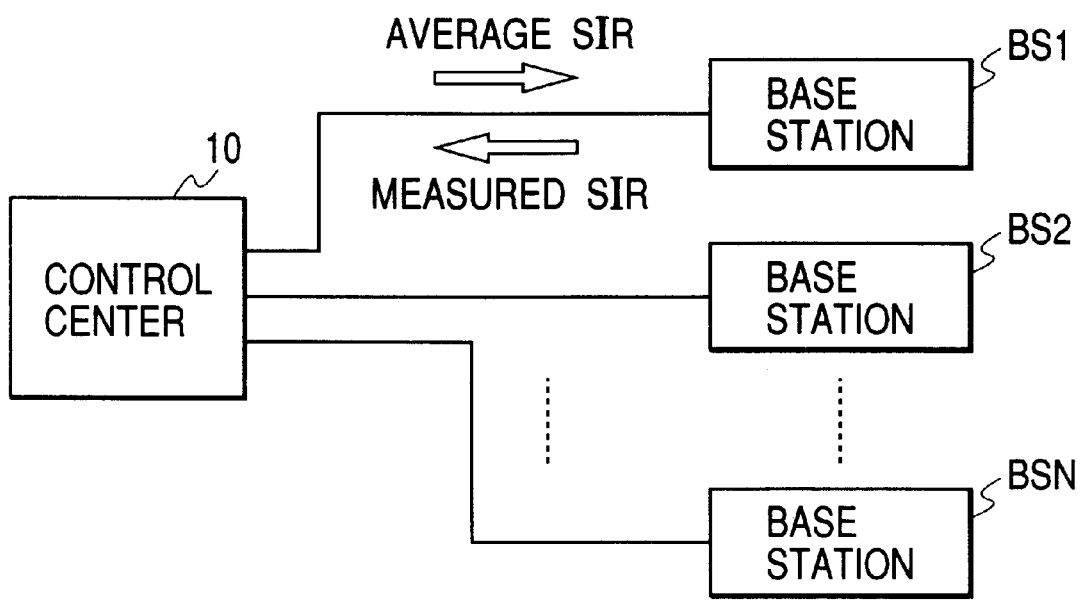
FIG. 19 is a diagram of a control center and base stations in a seventh embodiment of this invention.

With reference to FIG. 19, base stations BS1, BS2, ..., BSN are connected to a control center 10. The base stations BS1, BS2, ..., BSN are managed by the control center 10. The base stations BS1, BS2, ..., BSN measure communication qualities SIR1, SIR2, ..., SIRN, respectively. The base stations BS1, BS2, ..., BSN inform the control center 10 of the measured communication qualities SIR1, SIR2, ..., SIRN. The control center 10 calculates an average value SIRav among the communication qualities SIR1, SIR2, ..., SIRN. The control center 10 informs the base stations BS1, BS2, ..., BSN of the calculated average value SIRav.

In the base stations BSt (t=1, 2, ..., N), pilot-signal transmission powers PPSt (t=1, 2, ..., N) and desired uplink received-signal powers TPRt (t=1, 2, ..., N) are updated on the basis of the differences D_SIRt (t=1, 2, ..., N) between the average value SIRav and the communication qualities SIRt (t=1, 2, ..., N).

It should be noted that the updating of the pilot-signal transmission powers PPSt (t=1, 2, ..., N) and the desired uplink received-signal powers TPRt (t=1, 2, ..., N) may be executed by the control center 10. In this case, the control center 10 informs the base stations BSt (t=1, 2, ..., N) of the update results.

The above-mentioned processes are iterated until the communication qualities regarding the base stations BSt (t=1, 2, ..., N) become substantially equal to each other.

To suppress an adverse affection of variations in periods and places of occurrence of mobile stations, it is preferable that the communication qualities are iteratively measured at a relatively long period, and an averaging process is done.

The structures of the base stations BSt (t=1, 2, ..., N) are similar to each other. Accordingly, the structure of only one of the base stations will be explained below.

Figure 20:
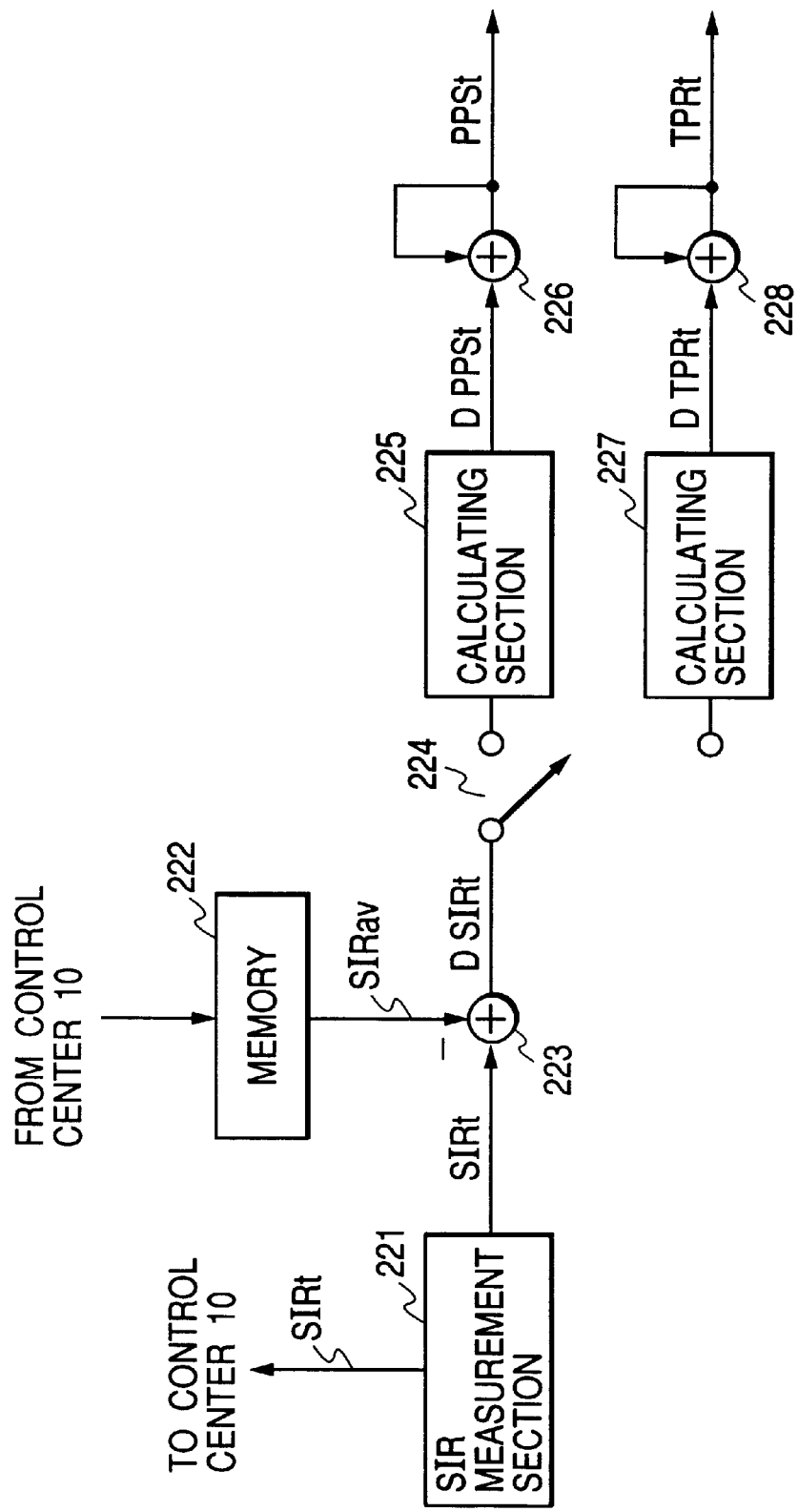
FIG. 20 is a diagram of a portion of the base station in FIG. 19.

With reference to FIG. 20, the base station BSt has a measurement section 221 for measuring a communication quality SIRt. The measurement of the communication quality SIRt is iterated at a relatively long period for the previously-mentioned reason. The measurement section 221 informs the control center 10 of the measured communication quality SIRt.

As previously explained, the control center 10 (see FIG. 19) is informed of the measured communication qualities SIR1, SIR2, ..., SIRN by the base stations BS1, BS2, ..., BSN. The control center 10 calculates an average value SIRav among the communication qualities SIR1, SIR2, ..., SIRN. The control center 10 informs the base stations BS1, BS2, ..., BSN of the calculated average value SIRav.

With reference to FIG. 20, the base station BSt includes a memory 222 into which the control center 10 stores information of the average value SIRav. The base station BSt also includes a subtracter 223 connected to the measurement section 221 and the memory 222. The subtracter 223 receives information of the communication quality SIRt from the measurement section 221. The subtracter 223 receives the information of the average value SIRav from the memory 222. The subtracter 223 calculates the difference D_SIRt between the communication quality SIRt and the average value SIRav.

The base station BSt has calculating sections 225 and 227 which are connected via a switch 224 to the subtracter 223. Firstly, information of the calculated difference D_SIRt is fed from the subtracter 223 to the calculating section 225 via the switch 224. The calculating section 225 converts the difference D_SIRt into an updating value D_PPSt for a pilot-signal transmission power PPSt according to a predetermined function F1. The function F1 corresponds to the updating coefficient "α1" in the equation (9). The calculating section 225 informs an adder 226 of the updating value D_PPSt. The adder 226 adds the updating value D_PPSt to a present pilot-signal transmission power PPSt, and thereby updates the present pilot-signal transmission power PPSt into a new pilot-signal transmission power PPSt.

The base station BSt outputs a downlink pilot radio signal at a power equal to the pilot-signal transmission power PPSt. Mobile stations are re-connected with the base station BSt in response to the downlink pilot radio signal.

Subsequently, the measurement section 221 measures the communication quality SIRt again. The measurement section 221 informs the control center 10 of the new measured communication quality SIRt. Then, the control center 10 stores the memory 222 with information of a new average value SIRav. The subtracter 223 calculates the difference D_SIRt between the new communication quality SIRt and the new average value SIRav. Information of the calculated difference D_SIRt is fed from the subtracter 223 to the calculating section 227 via the switch 224. The calculating section 227 converts the difference D_SIRt into an updating value D_TPRt for a desired uplink received-signal power TPRt according to a predetermined function F2. The function F2 corresponds to the updating coefficient "α2" in the equation (10). The calculating section 227 informs an adder 228 of the updating value D_TPRt. The adder 228 adds the updating value D_TPRt to a present desired uplink received-signal power TPRt, and thereby updates the present desired uplink received-signal power TPRt into a new desired uplink received-signal power TPRt.

In the base station BSt, the information of the desired uplink received-signal power TPRt is fed to sections of a transmitter which correspond to respective mobile stations. The information of the desired uplink received-signal power TPRt is transmitted via the sections of the transmitter to the mobile stations. Each mobile station controls its transmission power in response to the desired uplink received-signal power TPRt.

Subsequently, the measurement section 221 measures the communication quality SIRt again. Then, the pilot-signal transmission power PPSt is updated in a way similar to the previously-mentioned way. The above-mentioned processes are iterated until the measured communication qualities SIRt become substantially equal to the average value SIRav or fall into a given range around the average value SIRav given by the control center 10.

Accordingly, the CDMA cellular mobile radio communication network can follow changes of environmental radio conditions from initial states which occur at the time of designing. It is preferable that the updating of the cell structure of the CDMA cellular mobile radio communication network is iteratively executed at a relatively long period corresponding to, for example, several times per year. Alternatively, the updating of the cell structure of the CDMA cellular mobile radio communication network may be executed upon the occurrence of a change in the environmental radio conditions.

Figure 21:
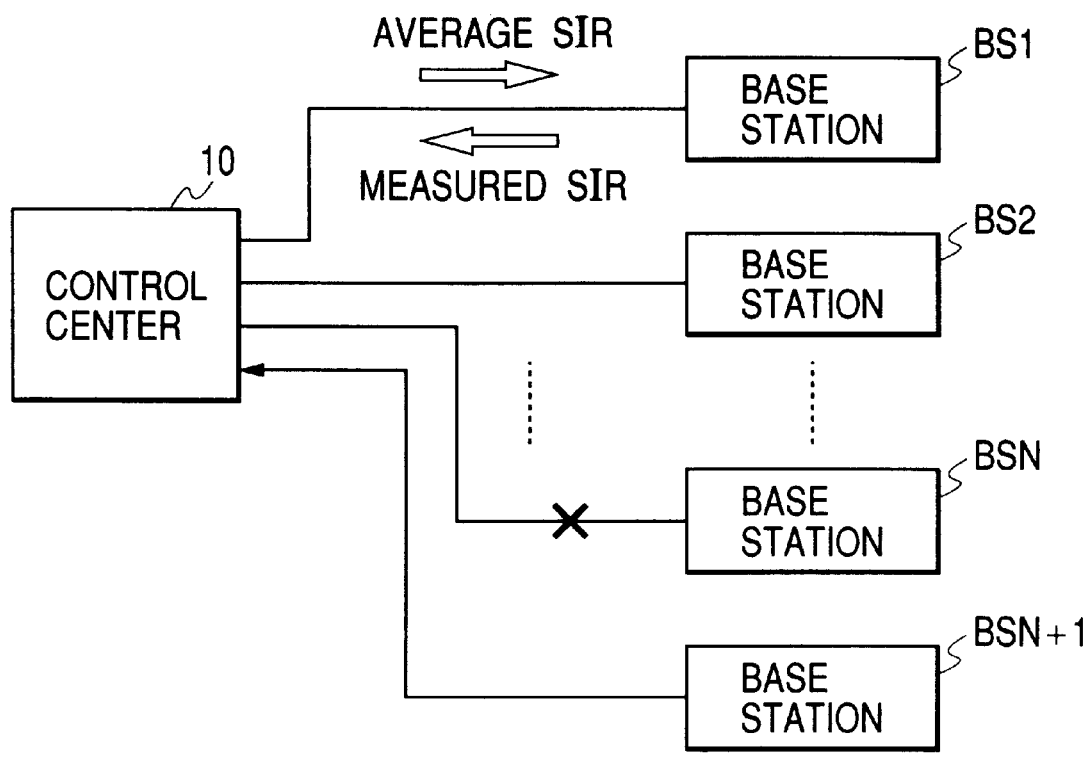
FIG. 21 is a diagram of the control center and the base stations in the seventh embodiment of this invention.

With reference to FIG. 21, in the event that the base station BSN fails, the control center 10 instructs base stations neighboring the base station BSN to increase pilot-signal transmission powers and to newly cover the area assigned to the base station BSN. In this case, the cells related to the base stations neighboring the base station BSN expand. According to the designs shown in FIGS. 19 and 20, the failure of the base station BSN is compensated by all the other base stations managed by the control center 10. This is advantageous in suppressing communication-quality reductions caused by the expansions of the cells.

With reference to FIG. 21, in the case where a base station BSN+1 is newly added to the CDMA cellular mobile radio communication network, the numbers of mobile stations in the cells and the conditions of interferences between the adjacent cells change so that a variation in communication quality among the base stations occurs. Even in this case, according to the designs shown in FIGS. 19 and 20, the affection of the addition of the new base station BSN+1 is compensated by all the other base stations managed by the control center 10. This is advantageous in suppressing the above-indicated variation in communication quality.

Eighth Embodiment

An eighth embodiment of this invention is similar to the sixth embodiment thereof except for design changes explained later.

Figure 22:
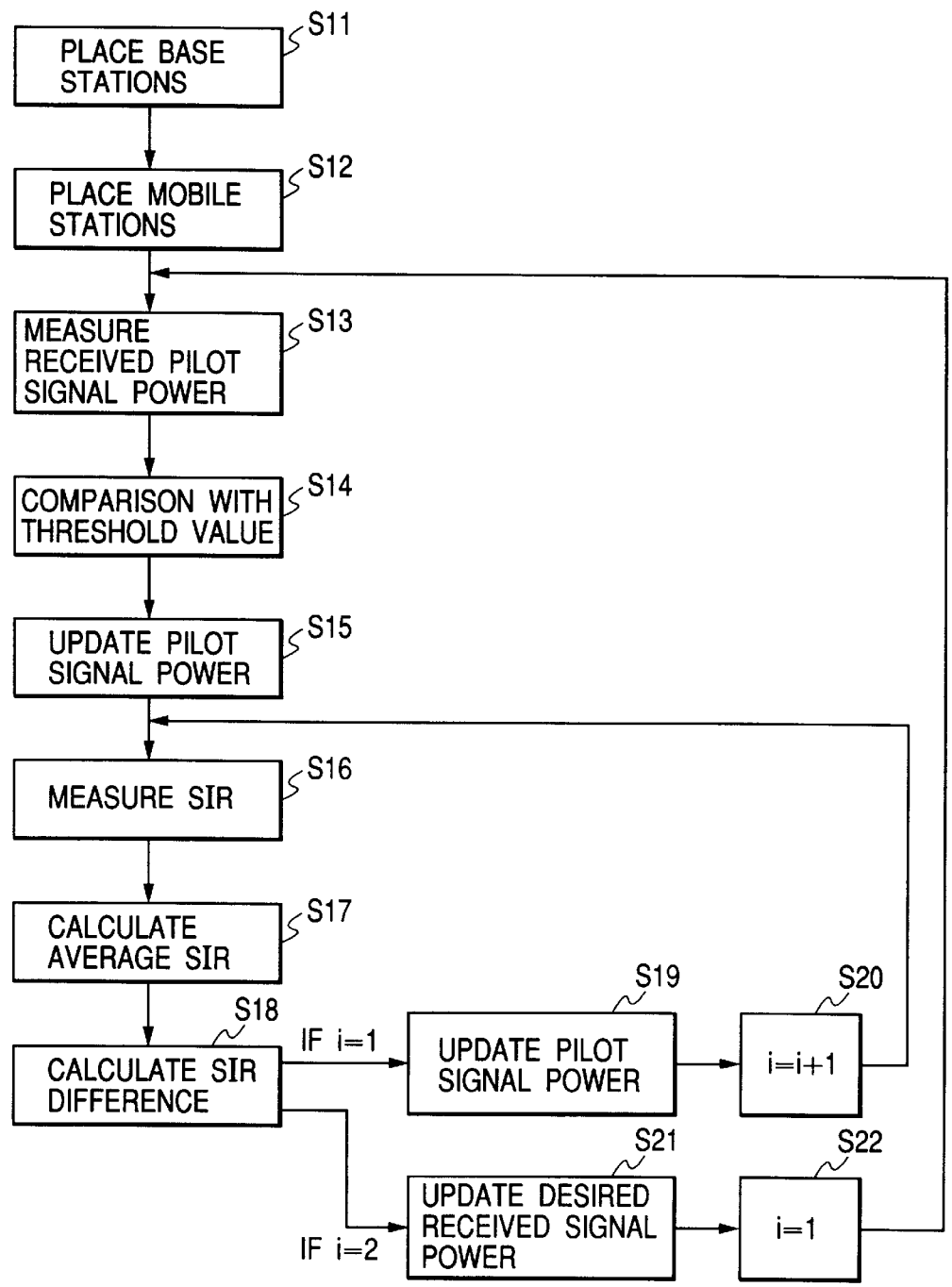
FIG. 22 is a flow diagram of a sequence of steps in a method of determining the cell structure of a CDMA cellular mobile radio communication network according to an eighth embodiment of this invention.

FIG. 22 shows a sequence of steps in a method of determining the cell structure of a CDMA cellular mobile radio communication network according to the eighth embodiment of this invention. Steps S11, S12, S16, S17, S18, S19, S20, S21, and S22 in FIG. 22 are similar to the steps S1, S2, S3, S4, S5, S6, S7, S8, and S9 in FIG. 17, respectively.

With reference to FIG. 22, the steps S12 and the step S22 are followed by a step S13. In the step S13, mobile stations connecting with base stations measure the powers of received downlink pilot signals. In addition, the mobile stations inform the related base stations of the measured powers of the received downlink pilot signals.

In a step S14 following the step S13, each of the base stations compares the received pilot-signals powers with each other which are given by the mobile stations connecting with the base station. As a result of the comparison, each of the base stations selects the minimum one (the lowest one) RP_min from among the received pilot-signal powers. In the step S14, the minimum received pilot-signal power RP_min and a predetermined threshold value RP_th are compared to each other to calculate the difference D_RP therebetween.

In a step S15 subsequent to the step S14, the pilot-signal transmission powers PPSt regarding the base stations are updated in response to the calculated differences D_RP. For example, regarding the base station BSG, the updating of the pilot-signal transmission power PPSG is implemented according to the following equations.

$$PPSG = PPSG\hat{} - \beta \cdot D\_RPG$$

$$D\_RPG = RP\text{min} - RP\_th \quad (11)$$

where PPSG^ denotes the pilot-signal transmission power which occurs before the updating, and "$\beta$" denotes a predetermined updating coefficient. The equations (11) are designed to implement the following processes. When the minimum received pilot-signal power RP_min is greater than the threshold value RP_th, the pilot-signal transmission power PPSG is reduced. On the other hand, when the minimum received pilot-signal power RP_min is smaller than the threshold value RP_th, the pilot-signal transmission power PPSG is increased. The step S15 is followed by the step S16.

The steps S13, S14, and S15 provide the following processes. When an actual pilot-signal transmission power in a base station is high so that the powers of received downlink pilot signals in mobile stations are relatively great, the actual pilot-signal transmission power in the base station is reduced. When an actual pilot-signal transmission power in a base station is low so that the powers of received downlink pilot signals in mobile stations are insufficient for correct identification and detection of the received downlink pilot signals, the actual pilot-signal transmission power in the base station is increased. As a result, the mobile stations are able to suitably identify and detect the received downlink pilot signals.

Ninth Embodiment

A ninth embodiment of this invention is similar to the sixth embodiment thereof except for design changes explained later.

Figure 23:
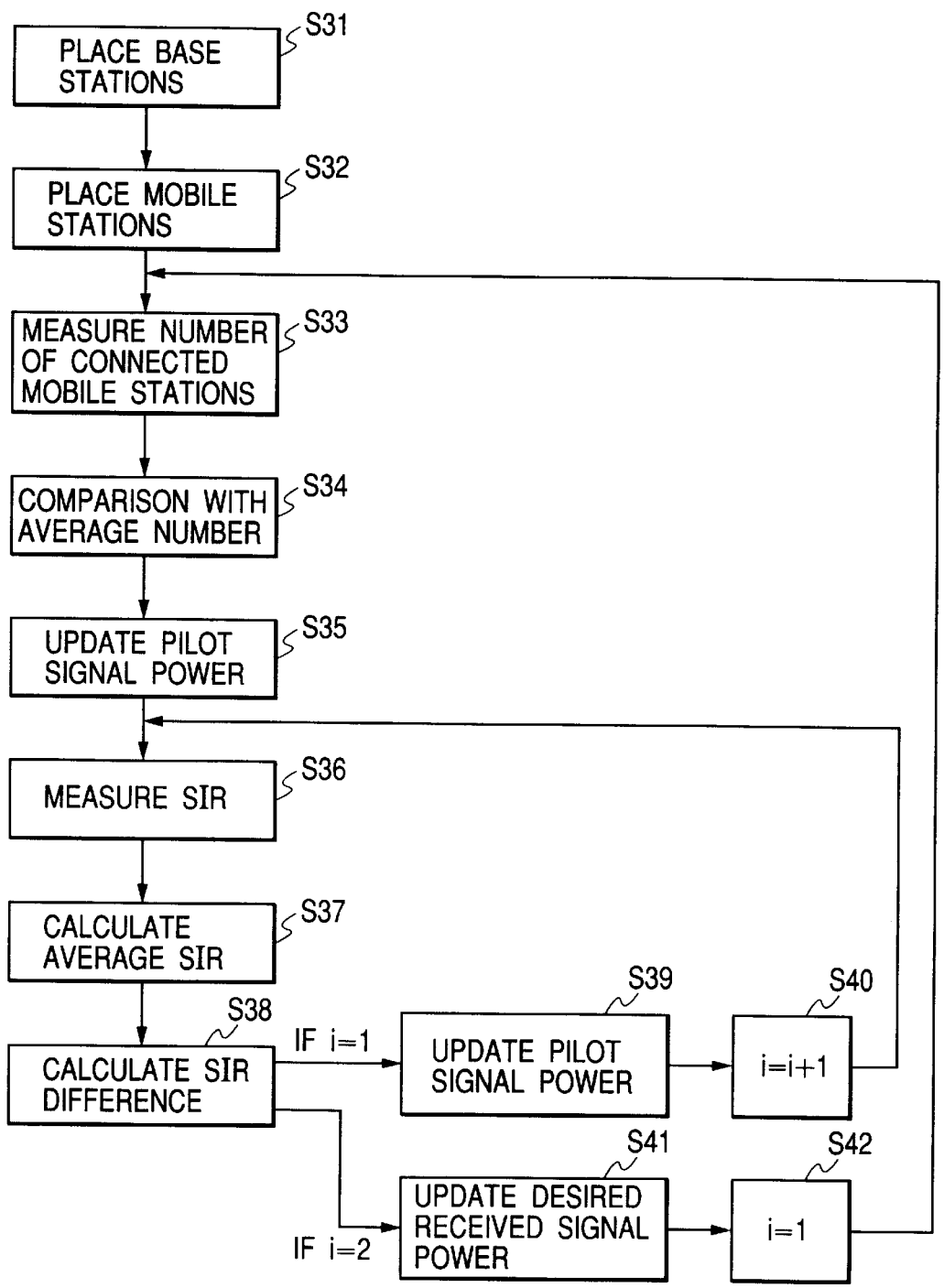
FIG. 23 is a flow diagram of a sequence of steps in a method of determining the cell structure of a CDMA cellular mobile radio communication network according to a ninth embodiment of this invention.

FIG. 23 shows a sequence of steps in a method of determining the cell structure of a CDMA cellular mobile radio communication network according to the ninth embodiment of this invention. Steps S31, S32, S36, S37, S38, S39, S40, S41, and S42 in FIG. 23 are similar to the steps S1, S2, S3, S4, S5, S6, S7, S8, and S9 in FIG. 17, respectively.

With reference to FIG. 23, the step S32 and the step S42 are followed by a step S33. The step S33 counts the number NA of mobile stations connecting with each of the base stations. The average number NAav of connected mobile stations per base station is previously calculated from the number of the base stations and the number of mobile stations in the whole area covered by the CDMA cellular mobile radio communication network.

In a step S34 following the step S33, the counted mobile-station number NA and the average mobile-station number NAav are compared to each other to calculate the difference D_NA therebetween.

In a step S35 subsequent to the step S34, the pilot-signal transmission powers PPSt regarding the base stations are updated in response to the calculated differences D_NA. For example, regarding the base station BSG, the updating of the pilot-signal transmission power PPSG is implemented according to the following equations.

$$PPSG = PPSG\hat{} - \beta \cdot D\_NAG$$

$$D\_NAG = NAG - NAav \quad (12)$$

where PPSG^ denotes the pilot-signal transmission power which occurs before the updating; "β" denotes a predetermined updating coefficient; and NAG denotes the counted mobile-station number. The equations (12) are designed to implement the following processes. Regarding a base station, when the counted mobile-station number NA is greater than the average mobile-station number NAav, the pilot-signal transmission power PPSG is reduced.

The reduction of the pilot-signal transmission power PPSG results in contraction of the related cell. Thus, in this case, the number of the mobile stations connecting with the base station is reduced. On the other hand, when the counted mobile-station number NA is smaller than the average mobile-station number NAav, the pilot-signal transmission power PPSG is increased. The increase in the pilot-signal transmission power PPSG results in expansion of the related cell. Thus, in this case, hand-off to the present cell from adjacent cells is implemented with respect to surplus mobile stations in the adjacent cells. The step S35 is followed by the step S36.

The steps S33, S34, and S35 cooperate to move or maintain the numbers of mobile stations connected to the base stations toward or at the average mobile-station number NAav. Thus, regarding the base stations, it is easy to design the radio unit number (the maximum number of connectable mobile stations).

Tenth Embodiment

A tenth embodiment of this invention is similar to the sixth embodiment thereof except for design changes explained later.

Figure 24:
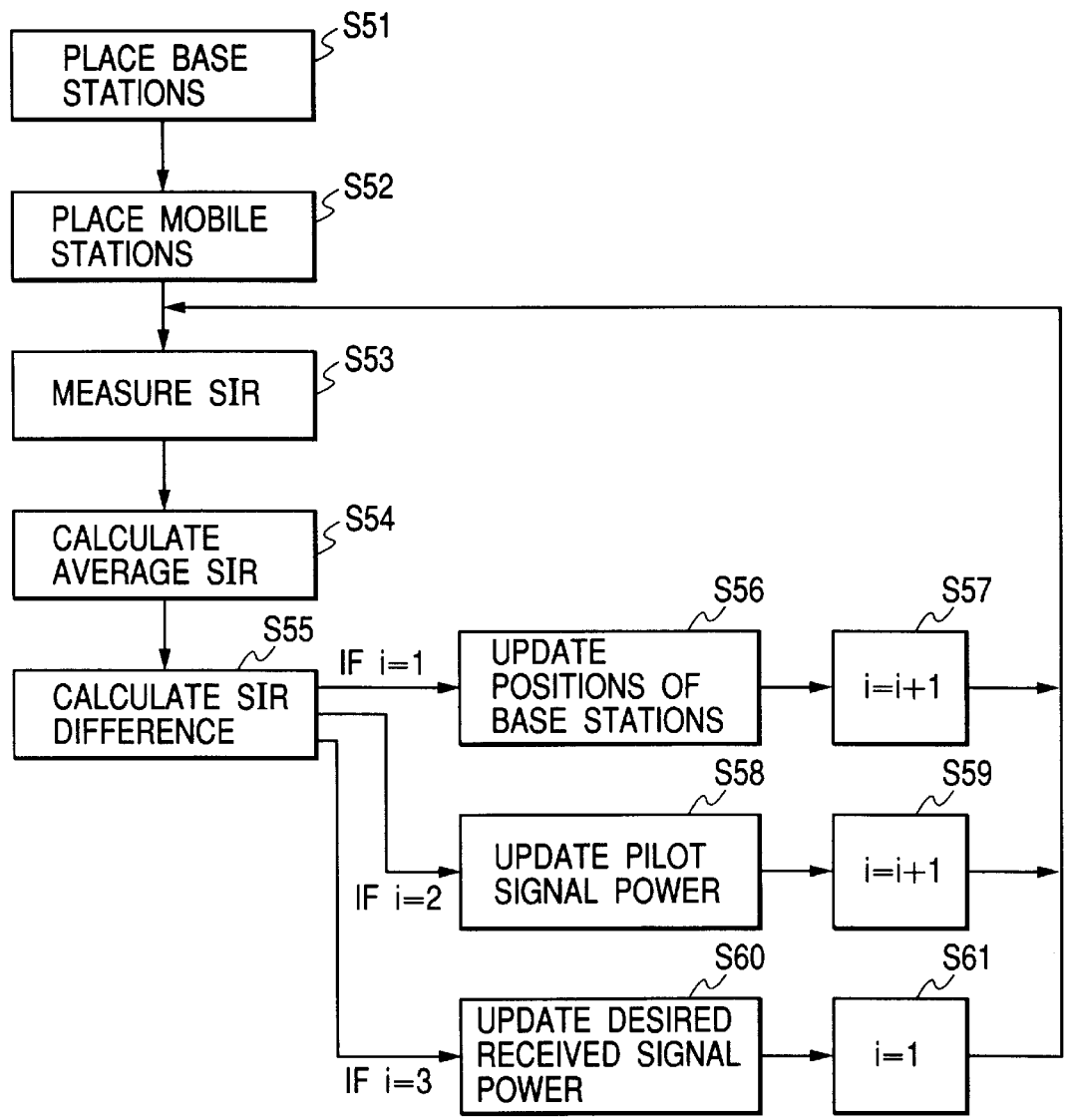
FIG. 24 is a flow diagram of a sequence of steps in a method of determining the cell structure of a CDMA cellular mobile radio communication network according to a tenth embodiment of this invention.

FIG. 24 shows a sequence of steps in a method of determining the cell structure of a CDMA cellular mobile radio communication network according to the tenth embodiment of this invention.

Steps S51, S52, S53, S54, S58, S59, S60, and S61 in FIG. 24 are similar to the steps S1, S2, S3, S4, S6, S7, S8, and S9 in FIG. 17, respectively.

With reference to FIG. 24, a step S55 following the step S54 calculates the differences D_SIRm (m=1, 2, . . . , M) between the average value SIRav and the communication qualities SIRm (m=1, 2, . . . , M). A decision is made as to whether or not all the communication quality differences D_SIRm (m=1, 2, . . . , M) are equal to zero or small values, and are hence substantially equivalent to the average value SIRav. When it is decided that all the communication quality differences D_SIRm (m=1, 2, . . . , M) are substantially equivalent to the average value SIRav, the pilot-signal transmission powers PPSm (m 1, 2, . . . , M), the desired uplink received-signal powers TPRm (m=1, 2, . . . , M), and calculated positions of the base stations BSm (m=1, 2, . . . , M) are set as final pilot-signal transmission powers (final designed pilot-signal powers), final desired uplink received-signal powers, and final base-station positions. Thus, in this case, the pilot-signal transmission powers PPSm (m=1, 2, . . . , M), the desired uplink received-signal powers TPRm (m=1, 2, . . . , M), and the base-station positions are not updated.

On the other hand, when it is decided that at least one of the communication quality differences D_SIRm (m=1, 2, . . . , M) is not substantially equivalent to the average value SIRav, the pilot-signal transmission powers PPSm (m=1, 2, . . . , M), the desired uplink received-signal powers TPRm (m=1, 2, . . . , M), or the base-station positions are updated.

A flag "i" is provided to designate the object to be updated. The flag "i" is changeable among "1", "2", and "3". When the flag "i" is "1" the updating of the base-station positions is implemented by a step S56. When the flag "i" is "2", the updating of the pilot-signal transmission powers PPSm (m=1, 2, . . . , M) is implemented by the step S58. When the flag "i" is "3", the updating of the desired uplink received-signal powers TPRm (m=1, 2, . . . , M) is implemented by the step S60. For example, an initial value of the flag "i" is "1". When the step S55 is executed for the first time, an advance from the step S55 to the step S56 is usually done.

In the step S56, the numbers of mobile stations connecting with the respective base stations are compared to each other to select the base station BSu managing the greatest number of mobile stations, that is, the base station BSu related to the most deteriorated communication quality. The position of the selected base station BSu is expressed by (Xu, Yu) in a two-dimensional coordinate system. The positions of the other base stations BSi are expressed by (Xi, Yi). The communication quality differences related to the base stations BSi are denoted by D_SIRi. In the step S56, the positions (Xi, Yi) of the other base stations BSi are updated to move toward the position (Xu, Yu) of the selected base station BSu by distances depending on the communication quality differences D_SIRi. Specifically, the updating of the positions (Xi, Yi) of the other base stations BSi is implemented according to the following equations.

$$Xi = Xi\hat{} + \beta \cdot D\_SIRi \cdot sg(Xu - Xi)$$

$$Yi = Yi\hat{} + \beta \cdot D\_SIRi \cdot sg(Yu - Yi) \quad (13)$$

where Xi^ denotes the base-station X positions which occur before the updating; Yi^ denotes the base-station Y positions which occur before the updating; "β" denotes a predetermined updating coefficient; and "sg( . . . )" denotes an operator indicating the sign of the value in the parentheses. For example, when the position Xu is in a positive side (a "+" side) of the position Xi, "sg( . . . )" indicates "+" and the position Xi is moved toward the "+" side. On the other hand, when the position Xu is in a negative side (a "−" side) of the position Xi, "sg( . . . )" indicates "−" and the position Xi is moved toward the "−" side.

The step S56 is followed by a step S57 which adds "1" to the flag "i". Thus, the flag "i" is changed from "1" to "2". After the step S57, a return to the step S53 is done. During a later stage, when the flag "i" is "2", the updating of the pilot-signal transmission powers PPSm (m 1, 2, . . . , M) is implemented by the step S58 after the step S55. When the flag "i" is "3", the updating of the desired uplink received-signal powers TPRm (m=1, 2, . . . , M) is implemented by the step S60 after the step S55. When the flag "i" is "1", the updating of the base-station positions is implemented by the step S56 after the step S55.

It should be noted that the base-station positions may be updated in response to the numbers NA of mobile stations connecting with the base stations to equalize the numbers NA.

As understood from the previous explanation, the step S56 serves to correct a non-uniform distribution of mobile stations with respect to base stations.

What is claimed is:

1. A power control system for a CDMA mobile radio communication network, comprising:

first means for iteratively controlling powers at which downlink pilot signals are transmitted from base stations so that the numbers of mobile stations managed by respective base stations will be in a predetermined range; and second means for iteratively controlling powers at which uplink signals are transmitted from the mobile stations so that communication qualities related to the uplink signals received by the base stations will converge on a predetermined threshold value;

wherein a first period of the iterative power controlling by the first means is longer than a second period for the iterative power controlling by the second means.

2. The power control system recited in claim 1, wherein the first means comprises means for updating the powers at which the downlink pilot signals are transmitted from the base stations when the numbers of the mobile stations managed by the base stations move out of an allowable range.

3. The power control system recited in claim 1, wherein the first means comprises means for updating the powers at which the downlink pilot signals are transmitted from the base stations when the communication qualities related to the uplink signals received by the base stations move out of an allowable range.

4. The power control system recited in claim 1, further comprising third means for setting desired powers of the uplink signals received by the base stations, and wherein the first means comprises means for updating the powers at which the downlink pilot signals are transmitted from the base stations when the desired powers of the uplink signals received by the base stations move out of an allowable range.

5. The power control system recited in claim 1, wherein the first means comprises means for updating the powers at which the downlink pilot signals are transmitted from the base stations, and the second means comprises means for controlling the powers at which the uplink signals are transmitted from the mobile stations in response to the powers of the downlink pilot signals which are updated by the means in the first means.

6. A method of determining the cell structure of a CDMA cellular mobile radio communication network, comprising the steps of:

1: updating powers at which downlink pilot signals are transmitted from base stations in response to differences between uplink communication qualities regarding the respective base stations and an average value among the uplink communication qualities regarding respective base stations;

2: updating desired powers of uplink signals received by the respective base stations in response to the differences between the uplink communication qualities regarding the respective base stations and the average value among the uplink communication qualities regarding the respective base stations;

3: iterating the steps 1 and 2 until the uplink communication qualities regarding the respective base stations are substantially equal to each other; and 4: determining pilot-signal transmission powers and desired uplink received-signal powers regarding the respective base stations by executing the steps 1, 2, and 3.

7. The method recited in claim 6, further comprising the steps of calculating differences between a threshold value for powers of pilot signals received by mobile stations and lowest values of powers of pilot signals received by the mobile stations, and updating the pilot-signal transmission powers in the base stations in response to the differences between the threshold value for the powers of the pilot signals received by the mobile stations and the lowest values of the powers of the pilot signals received by the mobile stations.

8. The method recited in claim 6, further comprising the steps of calculating numbers of base stations connecting with the respective base stations, calculating differences between an average number of connecting mobile stations per base station and the numbers of the base stations connecting with the respective base stations, and updating the pilot-signal transmission powers in the base stations in response to the calculated differences between the average number of connecting mobile stations per base station and the numbers of the base stations connecting with the respective base stations.

9. The method recited in claim 6, further comprising the step of updating positions of the respective base stations in response to the differences between the uplink communication qualities regarding the respective base stations and the average value among the uplink communication qualities regarding the respective base stations.

10. The method recited in claim 6, further co rising the steps of making a simulation model on the basis of a predicted distribution of mobile stations and measured values of signal propagation characteristics, and executing the steps 1, 2, 3, and 4 with respect to the simulation model.

11. The method recited in claim 6, further comprising the steps of measuring the communication qualities related to the uplink signals received by the base stations, and executing the steps 1, 2, 3, and 4 in the base stations.

12. A CDMA cellular mobile radio communication network comprising:

base stations;

mobile stations;

first means provided in the base stations for measuring uplink communication qualities regarding respective base stations;

second means for updating powers at which downlink pilot signals are transmitted from the base stations in response to differences between the uplink communication qualities regarding the respective base stations and an average value among the uplink communication qualities regarding the respective base stations;

third means for updating desired powers of uplink signals received by the respective base stations in response to the differences between the uplink communication qualities regarding the respective base stations and the average value among the uplink communication qualities regarding the respective base stations; and fourth means for causing the second means and the third means to iterate the updating until the uplink communication qualities regarding the respective base stations converge on the average value among the uplink communication qualities regarding the respective base stations, and thereby for determining pilot-signal transmission powers and desired uplink received-signal powers regarding the respective base stations.

13. The CDMA cellular mobile radio communication network recited in claim 12, further comprising a control center connected to the base stations and calculating the average value among the uplink communication qualities regarding the respective base stations.

14. The CDMA cellular mobile radio communication network recited in claim 12, further comprising fifth means for causing the second means and the third means to execute the updating when the number of the base stations is changed.

15. The CDMA cellular mobile radio communication network recited in claim 12, further comprising fifth means for calculating differences between a threshold value for powers of pilot signals received by mobile stations and lowest values of powers of pilot signals received by the mobile stations, and sixth means for updating the pilot-signal transmission powers in the base stations in response to the differences between the threshold value for the powers of the pilot signals received by the mobile stations and the lowest values of the powers of the pilot signals received by the mobile stations.

16. The CDMA cellular mobile radio communication network recited in claim 12, further comprising fifth means for calculating numbers of the base stations connecting with the respective base stations, sixth means for calculating differences between an average number of connecting mobile stations per base station and the numbers of the base stations connecting with the respective base stations, and seventh means for updating the pilot-signal transmission powers in the base stations in response to the calculated differences between the average number of connecting mobile stations per base station and the numbers of the base stations connecting with the respective base stations.

17. A power control system for a CDMA mobile radio communication network, comprising:

first means for iteratively controlling powers at which downlink pilot signals are transmitted from base stations so that the numbers of mobile stations managed by respective base stations will be in a predetermined range;

second means for iteratively controlling powers at which uplink signals are transmitted from the mobile stations so that communication qualities related to the uplink signals received by the base stations will converge on a predetermined threshold value; and third means for causing a first period of the iterative power controlling by the first means to be longer than a second period of the iterative power controlling by the second means.

* * * * *

UNITED STATES PATENT AND TRADEMARK OFFICE
CERTIFICATE OF CORRECTION

PATENT NO.      : 6,385,183 B1
DATED           : May 7, 2002
INVENTOR(S)     : Takeo It is certified that error appears in the above-identified patent and that said Letters Patent is hereby corrected as shown below:

<u>Title page,</u>
Item [73], should read:
-- [73] Assignees:   OKI Electric Industry Co., Ltd. (Tokyo, Japan); and YRP Mobile Telecommunications Key Techology Research Laboratories Co., Ltd. (Kanagawa-ken, Japan) --

Signed and Sealed this

Twenty-fifth Day of February, 2003

JAMES E. ROGAN
*Director of the United States Patent and Trademark Office*